(12) United States Patent
Zhao et al.

(10) Patent No.: US 11,272,538 B2
(45) Date of Patent: Mar. 8, 2022

(54) METHOD, DEVICE, AND SYSTEM FOR TRANSMITTING INFORMATION AND COMPUTER STORAGE MEDIUM

(71) Applicant: XI'AN ZHONGXING NEW SOFTWARE CO., LTD., Shaanxi (CN)

(72) Inventors: Yajun Zhao, Shenzhen (CN); Hanqing Xu, Shenzhen (CN); Xincai Li, Shenzhen (CN); Ling Yang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/324,801

(22) PCT Filed: Nov. 15, 2016

(86) PCT No.: PCT/CN2016/105973
§ 371 (c)(1),
(2) Date: May 14, 2019

(87) PCT Pub. No.: WO2018/028076
PCT Pub. Date: Feb. 15, 2018

(65) Prior Publication Data
US 2019/0268938 A1  Aug. 29, 2019

(30) Foreign Application Priority Data
Aug. 12, 2016 (CN) .......................... 201610666259.9

(51) Int. Cl.
*H04W 74/08* (2009.01)
*H04L 1/00* (2006.01)
(Continued)

(52) U.S. Cl.
CPC ....... *H04W 74/0808* (2013.01); *H04L 1/0026* (2013.01); *H04L 1/1819* (2013.01);
(Continued)

(58) Field of Classification Search
CPC . H04L 1/0026; H04L 1/1819; H04L 25/0226; H04L 5/005; H04L 5/0055;
(Continued)

(56) References Cited

U.S. PATENT DOCUMENTS

2014/0105191 A1* 4/2014 Yang ..................... H04L 1/1867
370/336
2016/0277944 A1* 9/2016 Bhushan ............... H04L 5/0044
(Continued)

FOREIGN PATENT DOCUMENTS

CN      102447538 A     5/2012
WO      2016019904 A1   2/2016

OTHER PUBLICATIONS

Nam et al., "Method and Apparatus for Supporting Multiple Services in Advanced MIMO Communication Systems", Jun. 29, 2016, Samsung Electronics Co., U.S. Appl. No. 62/356,216, Total pp. 53 (Year: 2016).*
(Continued)

*Primary Examiner* — Shah M Rahman
(74) *Attorney, Agent, or Firm* — Cantor Colburn LLP

(57) ABSTRACT

Disclosed are a method, a device and a system for transmitting information and a computer storage medium. The method for transmitting information in the embodiments of the present disclosure comprises: a base station acquiring a configured self-contained structure, the self-contained structure comprising a time-frequency resource structure; and the base station sending data information or receiving data information according to the self-contained structure.

19 Claims, 5 Drawing Sheets

UE receives a self-contained structure, includeing a time-frequency resource structure — S210

The UE receives data information or sends data information according to the self-contained structure — S220

(51) Int. Cl.
  *H04L 1/18* (2006.01)
  *H04L 5/00* (2006.01)
  *H04L 25/02* (2006.01)
  *H04W 24/10* (2009.01)
  *H04W 48/16* (2009.01)
  *H04W 72/04* (2009.01)
  *H04W 74/02* (2009.01)
  *H04W 80/08* (2009.01)

(52) U.S. Cl.
  CPC .......... *H04L 5/005* (2013.01); *H04L 25/0226* (2013.01); *H04W 24/10* (2013.01); *H04W 48/16* (2013.01); *H04W 72/04* (2013.01); *H04W 72/046* (2013.01); *H04W 72/0446* (2013.01); *H04W 72/0453* (2013.01); *H04W 74/02* (2013.01); *H04W 80/08* (2013.01)

(58) Field of Classification Search
  CPC ..... H04W 24/10; H04W 48/16; H04W 72/04; H04W 72/0446; H04W 72/0453; H04W 72/046; H04W 74/02; H04W 74/0808; H04W 80/08
  See application file for complete search history.

(56) References Cited

U.S. PATENT DOCUMENTS

| | | | | |
|---|---|---|---|---|
| 2017/0135102 A1* | 5/2017 | Ma | | H04W 72/1263 |
| 2017/0150513 A1* | 5/2017 | Abraham | | H04W 74/0816 |
| 2017/0156140 A1* | 6/2017 | Islam | | H04L 5/0064 |
| 2017/0170944 A1* | 6/2017 | Ang | | H04W 72/042 |
| 2017/0201968 A1* | 7/2017 | Nam | | H04W 72/042 |
| 2017/0208568 A1* | 7/2017 | Nam | | H04L 5/0094 |
| 2017/0208583 A1* | 7/2017 | Jiang | | H04L 5/0055 |
| 2017/0245259 A1* | 8/2017 | Islam | | H04L 1/003 |
| 2017/0257860 A1* | 9/2017 | Nam | | H04W 72/0446 |
| 2017/0339676 A1* | 11/2017 | Belghoul | | H04W 72/042 |
| 2017/0353912 A1* | 12/2017 | Einhaus | | H04L 5/0048 |
| 2017/0366311 A1* | 12/2017 | Iyer | | H04B 7/0482 |
| 2017/0367058 A1* | 12/2017 | Pelletier | | H04W 56/0045 |
| 2018/0110041 A1* | 4/2018 | Bendlin | | H04L 27/2613 |
| 2018/0205534 A1* | 7/2018 | Yi | | H04J 3/02 |
| 2018/0254851 A1* | 9/2018 | Roessel | | H04L 1/1861 |
| 2019/0029071 A1* | 1/2019 | Moon | | H04L 5/005 |
| 2019/0058516 A1* | 2/2019 | Yang | | H04B 7/0626 |
| 2019/0089498 A1* | 3/2019 | Pelletier | | H04L 5/0053 |
| 2019/0098626 A1* | 3/2019 | Yi | | H04W 72/0446 |
| 2019/0104551 A1* | 4/2019 | Deenoo | | H04W 72/0446 |
| 2019/0229789 A1* | 7/2019 | Zhang | | H04B 7/0617 |
| 2019/0239171 A1* | 8/2019 | Ahn | | H04W 72/12 |
| 2020/0229152 A1* | 7/2020 | Park | | H04W 72/042 |
| 2020/0260527 A1* | 8/2020 | Xiong | | H04L 5/10 |

OTHER PUBLICATIONS

Jiang et al. "Coded Uplink Acknowledgement With Systematic Bits in Self-Contained Subframe and More Coded Bits in Uplink-Centric Subframe", Jan. 20, 2016, QUALCOMM Incorporated, U.S. Appl. No. 62/280,889, Total pp. 34 (Year: 2016).*

Yi et al., "ICIC Mechanisms for TDD Based NR Design", Apr. 26, 2016, LG Electronics Inc., U.S. Appl. No. 62/328,000, Total pp. 18 (Year: 2016).*

Qi Wang et al., Enhancing OFDM by Pulse Shaping for Self-Contained TDD Transmission in 5G; URL: https://ieeexplore.ieee.org/document/7504238.

TDD Frame Structure with Mixed Numerology; May 27, 2016; 5 pages.

International Search Report for International Application No. PCT/CN2016/105973; Date of Completion: Apr. 17, 2017; dated May 3, 2017; 7 Pages.

"Discussions on HARQ operation for NR", ZTE, ZTE Microelectronics, 3GPP TSG-RAN WG1 Meeting #85, Nanjing, China, May 23-27, 2016, 6 Pages.

Extended European Search Report for European Application No. 16912530.9; Date of Completion: Feb. 24, 2020; dated Jun. 24, 2020; 9 Pages.

* cited by examiner

METHOD, DEVICE, AND SYSTEM FOR TRANSMITTING INFORMATION AND COMPUTER STORAGE MEDIUM

CROSS REFERENCE

This application is the 371 application of PCT Application No. PCT/CN2016/105973 filed Nov. 15, 2016, which is based upon and claims priority to Chinese Patent Application No. 201610666259.9, filed on Aug. 12, 2016 the entire contents thereof are incorporated herein by reference.

TECHNICAL FIELD

The present application relates to, but is not limited to, the field of radio communications, and more particularly, to a method, a device and a system for transmitting information, and a computer storage medium.

BACKGROUND

In existing wireless communication systems, scheduling, transmission of data information, and corresponding feedback are typically controlled using relatively independent resources. For example, in the 4th Generation Mobile Communication (4G) Long Term Evolution (LTE) system (4G LTE), uplink feedback information (e.g., acknowledgment/non-acknowledgment, ACK/NACK) corresponding to transmission of downlink data channels only needs uplink subframe feedback satisfying interval constraint of 4 ms (millisecond).

The resources for transmitting the downlink data channel and the resources for transmitting the ACK/NACK form a complete structure with each other, such an existing resource relationship brings about complexity of timing crossing between different nodes and services. It has been proposed in related art to solve the above problem by a concept of self-contained subframe structure, which includes a time domain resource structure. Specifically, with a granularity of one subframe (1 ms), an appropriate structure is included in each subframe to perform information transmission. However, the self-contained structure with the sub-frame granularity is limited to the duration of 1 ms, and cannot meet the transmission requirements of various application scenarios. For example, when the data information to be transmitted has a longer duration (greater than 1 ms), the information transmission cannot be implemented by means of the self-contained sub-frame structure in related art.

In summary, it is proposed in the present disclosure on how to provide a more flexible self-contained structure, so as to meet traffic transmission needs of various application scenarios, thereby improving system performance.

SUMMARY

In order to solve the above technical problem, embodiments of the present disclosure provide a method, a device, and a system for transmitting information. The embodiments of the present disclosure proposes a design of self-contained structure with high flexibility, so as to solve the problem in related art where limitation of the self-contained subframe structure is great and poor adaptability of the transmission mode is caused.

According to a first aspect, embodiments of the disclosure provide an information transmission method, including:

acquiring, by a base station, a self-contained structure as configured, the self-contained structure including a time-frequency resource structure; and sending or receiving, by the base station, data information according to the self-contained structure.

According to a second aspect, embodiments of the disclosure provides an information transmission method, including:

acquiring, by a user equipment UE, a self-contained structure, the self-contained structure including a time-frequency resource structure; and sending or receiving, by the UE, data information according to the self-contained structure.

According to a third aspect, embodiments of the disclosure provides an information transmission method including:

configuring a mixed transmission manner of different traffic channels; and performing traffic transmission based on the configured mixed transmission manner of different traffic channels.

According to a fourth aspect, embodiments of the disclosure provides an information transmission method, including:

configuring first service identifier information to be sent at a preset time interval before transmission of a first service; and transmitting the first service identifier information based on the configuration.

According to a fifth aspect, embodiments of the disclosure provides an information transmission device, including:

an acquiring module, configured to acquire a self-contained structure configured by a base station, the self-contained structure including a time-frequency resource structure; and a transmitting module, configured to send or receive data information according to the self-contained structure acquired by the acquiring module.

According to a sixth aspect, embodiments of the disclosure provides an information transmission device, including:

an acquiring module, configured to acquire a self-contained structure, the self-contained structure including a time-frequency resource structure; and a transmitting module, configured to send or receive data information according to the self-contained structure acquired by the acquiring module.

According to a seventh aspect, embodiments of the disclosure provides an information transmission system, including: a based station and at least one user equipment UE within a coverage of the based station, wherein the base station is provided with the information transmission device according to any one of the fifth aspect, the UE is provided with the information transmission device according to any one of the sixth aspect.

According to an eighth aspect, embodiments of the disclosure provides computer storage medium, storing computer program, wherein the computer program are configured to implement the information transmission method as described above.

According to the information transmission method, device and system provided by the present disclosure, a self-contained structure as configured is acquired by a base station, and data information is sent or received according to the self-contained structure, wherein the self-contained structure includes one or more structures of time-frequency resource structure. Compared with the self-contained subframe structure in prior art, the embodiments of the present disclosure proposes a design of self-contained structure with high flexibility, so as to solve the problem in related art where limitation of the self-contained subframe structure is great and poor adaptability of the transmission mode is caused, so as to meet the demand of time length for data traffic transmission in a variety of application scenarios, achieving a high adaptability.

BRIEF DESCRIPTION OF THE DRAWINGS

The drawings are used to provide a further understanding of the technical solutions of the present disclosure, and constitute a part of the specification, which together with the embodiments of the present application are used to explain the technical solutions of the present disclosure, and do not constitute a limitation of the technical solutions of the present disclosure.

DETAILED DESCRIPTION

The embodiments of the present disclosure will be described in detail below with reference to the accompanying drawings. It should be noted that, in the case of no conflict, the features in the embodiments and the embodiments in the present application may be arbitrarily combined with each other.

The steps illustrated in the flowchart of the figures may be executed in a computer system such as a set of computer executable instructions. Also, although logical sequences are shown in the flowcharts, in some cases the steps shown or described may be performed in a different order than the ones described herein.

The technical solution of the embodiment of the present disclosure is described in detail below by using a specific embodiment. The base station (Based Service, BS for short) in the following embodiments may be, for example, an evolved Node B in an LTE system. For example, the user equipment (User Equipment, UE for short) may be, for example, a UE within the coverage of the base station. The following specific embodiments of the present disclosure may be combined with each other, and the same or similar concepts or processes may not be described in some embodiments.

Figure 1:
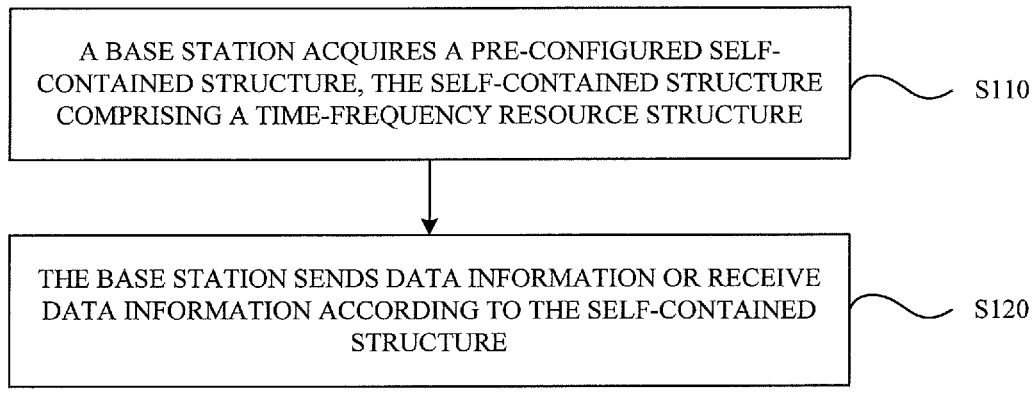
FIG. 1 is a flowchart illustrating an information transmission method according to an embodiment of the present disclosure.

FIG. 1 is a flowchart of an information transmission method according to an embodiment of the present disclosure. The information transmission method provided by this embodiment may be implemented by an information transmission device, which is implemented by a combination of hardware and software, and the apparatus may be integrated in a processor of the base station for use by the processor. As shown in FIG. 1, the method in this embodiment may include:

S110. The base station acquires a self-contained structure of the configuration, where the self-contained structure includes a time-frequency resource structure.

The information transmission method provided by the embodiment of the present disclosure is a method for transmitting information by using a self-contained structure, and the self-contained structure may be pre-configured, for example, the management network element in the network may be configured for the base station, or may be The base station is dynamically configured. In the embodiment, the self-contained structure includes components for performing information transmission, and the components included therein may also reflect the process of information transmission.

The time-frequency resource structure in this embodiment may include at least one of the following structures:

Structure 1: The time-frequency resource structure may include a downlink control channel, a downlink data channel, and a downlink signal;

Structure 2: The time-frequency resource structure may include an uplink control channel, an uplink data channel, and an uplink signal;

Structure 3: The time-frequency resource structure may include a downlink control channel, a downlink data channel, a downlink signal, and an uplink control channel and an uplink signal;

Structure 4: The time-frequency resource structure may include an uplink control channel, an uplink data channel, an uplink signal, and a downlink control channel and a downlink signal;

Structure 5: The time-frequency resource structure may include a downlink control channel, a downlink data channel, a downlink signal, and an uplink control channel, an uplink data channel, and an uplink signal.

For example, when the time-frequency resource structure is the above-mentioned structure, it can be used for the base station to transmit the downlink data service. When the time-frequency resource structure is the above-mentioned structure 3, the same is used for the base station to send the downlink data service, which is different from the uplink control channel in the structure 1. And the uplink signal is used to cooperate with the downlink data traffic transmission, for example, the base station can receive the feedback message of the UE.

S120. The base station sends data information or receives data information according to the self-contained structure.

In this embodiment, the role of the pre-configured self-contained structure is to realize information transmission. According to the content of the time-frequency resource structure in the self-contained structure, it can be seen that in order to perform transmission of different types of information, the time-frequency resource structure can be designed. The different components, that is, the above structure 1 to structure 5 can be applied to the transmission of different service types and different requirements. After obtaining the self-contained structure, the base station can perform corresponding transmission modes according to the acquired components of the self-contained structure, including sending. Data information or receiving data information.

Compared with the self-contained subframe structure in the existing LTE technology, the time-frequency resource structure of the self-contained structure in this embodiment includes a time domain resource structure and a frequency domain resource structure, and the time domain resource structure may include one or Multiple basic units, for example, including one or more subframes, Transmission Time Interval (TTI) or Orthogonal Frequency Division Multiplexing (OFDM) symbols, frequency domain resources One or more resource blocks (Resource Blocks, RBs), subcarriers, or component carriers may be included. Apparently, the structure design of the self-contained structure in the embodiment of the present disclosure is more flexible, and is not limited to one sub-frame in the time domain. Therefore, the data traffic transmission duration in various application scenarios can be met. Higher adaptability.

The information transmission method provided in this embodiment acquires the configured self-contained structure by the base station, and sends data information or receives data information according to the self-contained structure, where the self-contained structure includes one or more structures of time-frequency resource structure. Compared with the self-contained sub-frame structure in the prior art, the present embodiment solves the limitation in the prior art due to the limitation of the self-contained sub-frame structure by designing a highly flexible self-contained structure. The problem of poor adaptability of the transmission mode, so as to meet the demand for the length of data traffic transmission in a variety of application scenarios, has a high adaptability.

Further, the self-contained structure in the embodiment of the present disclosure further includes at least one of the following: a beam resource structure, a resource structure of an unlicensed carrier, and a code domain resource structure.

Among them, the resource structure of the unlicensed carrier usually needs to consider the following issues:

1), occupation time, 1 ms self-contained sub-frame structure cannot meet the needs of various application scenarios, that is, a self-contained structure requiring a longer time domain;

2) Whether the feedback processing delay can meet the demand, for example, the feedback delay of the ACK/NACK;

3) Enhance the hybrid transmission of mobile broadband (eMBB) and other service data, or/and reuse of different UEs;

4) The effect of the occupancy probability of the Clear Channel Assessment (CCA) on the structure of the time-frequency resource;

5), the occupational requirements of the frequency domain resource structure, usually need to meet >=80% of the system claims bandwidth occupation requirements, can use the interleaved structure and nominal bandwidth;

6) Maximum Channel Occupancy Time (MCOT) constraints on the self-contained structure.

In addition, the code domain resource structure may be embodied by the same signal in the same self-contained structure or/and a sequence used by the same channel, and is a description of the code domain resource structure in the self-contained structure. The following examples illustrate the sequence used in the self-contained structure. Different situations:

For example 1, the physical downlink shared channel (Physical Downlink Shared Channel, PDSCH) in the self-contained structure occupies multiple subframes, and the scrambling code of the PDSCH of different subframes may be: the same scrambling code of different subframes; or, the PDSCH Based on the scrambling code of one subframe, the scrambling code of the subsequent subframe relative to the first subframe of the PDSCH is rotated; or, based on the scrambling code of the first subframe of the self-contained structure, the subsequent subframe is relative to the first self-contained structure The scrambling code rotation of the subframe.

For example 2, Discovery Reference Signal (DRS), and Primary Synchronization Signal (PSS) or Secondary Synchronization Signal (SSS) can be cell/beam specific. Reference signal. For the same cell/beam, it is assumed that the DRS and PSS/SSS sequences in different self-contained structures are the same, and unless there is a signaling update configuration, such a configuration facilitates the UE to detect and identify.

For example 3, for an uplink discovery signal (Uplink-DRS, referred to as: UL-DRS), it may be a UE-specific reference signal. It is assumed that the UL-DRS sequences in different self-contained structures are the same, unless there is a signaling update configuration, such a configuration is advantageous for more flexible mobility management of different network nodes on the UE side, and better implementation of UE-centric mobility. Sex management mechanism.

The self-contained structure in the embodiment of the present disclosure includes not only a time-frequency resource structure, but also at least one of a beam resource structure, a resource structure of an unlicensed carrier, and a code domain resource structure. Considering the composition of the self-contained structure, a self-contained structure with a higher dimension is designed to make the self-contained structure more widely used for data transmission.

In the embodiment of the present disclosure, the time-frequency resource structure is the main content of the self-contained structure, and the following are respectively used for the content of the time-frequency resource structure and the various channels and signal signals involved in the time-frequency resource structure described in the foregoing structure 1 to structure 5. Description are provided as follow.

1) The content of the time-frequency resource structure may include at least one of the following: a time domain resource structure, a frequency domain resource structure, and a spatial resource structure.

The time domain resource structure includes: time-frequency resource structure duration information, which may be composed of one or more OFDM symbol, or one or more subframes, or one or more TTIs, or one or A plurality of predefined duration units are formed; start time information of the time-frequency resource structure; end time information of the time-frequency resource structure. Optionally, for an unlicensed carrier, it may be composed of one or more MCOTs. If the time-frequency resource structure is greater than the MCOT duration, it may be composed of multiple MCOTs. Further, the MCOT needs to perform a listener first (Listen-Before-talk, abbreviated as: LBT), the carrier is idle or allowed to share the time-frequency resources with other access points to occupy the time domain resources.

The frequency domain resource structure may include at least one of the following information: bandwidth information, such as one or more RBs, one or more subcarriers, one or more component carriers, one or more predefined bandwidth units; frequency domain structure information For example, a continuous frequency domain resource structure, an interleaved resource frequency domain structure, and other discrete frequency domain resource structures. Optionally, for an unlicensed carrier, for example, the indicated frequency domain resource structure occupies 80% or more of the system bandwidth.

The spatial resource structure includes: beam index information of a time-frequency resource structure, or a precoding matrix/vector, such as one or more identification (ID) information, one or more precoding matrices/vectors.

2) The downlink control channel is used to transmit control information for time-frequency resource structure The control information transmitted by the downlink control channel includes at least one of the following: control channel resource information, data channel resource information, signal resource information, resource signal, indication information of the time-frequency resource structure, and timing of transmitting the indication information, and scheduling information and Reserve resource information.

The control channel resource information is used to indicate the occupied resource information, and may include: a time-frequency resource location, a time-frequency resource structure, an occupied duration information, a start time information, and an end time information.

The data channel resource information may include: a time-frequency resource location, a time-frequency resource structure, an occupied duration information, a start time information, an end time information, and a time domain resource location relationship with the control channel.

The signal resource information may include at least one of the following: a preamble reference signal, a channel state information reference signal, a demodulation reference signal, a synchronization reference signal, an occupancy signal, an identification signal, and the like;

The resource signal may include: time-frequency position/structure information of the signal, antenna port information, sequence information, identification (ID) information, and the like.

The indication information of the time-frequency resource structure is used to indicate the specific content of the resource structure of the downlink control channel in the time-frequency resource structure, and the sending timing of the indication information may include: an initial indication of the time-frequency resource structure, each subframe indication, and each TTI Indicates, each predefined time resource unit indication. Optionally, first, A is indicated at the beginning of the resource structure, if B is not further indicated at other locations of the resource structure, corresponding transmission and/or reception may be performed according to the start indication A; if B is further indicated at other locations of the resource structure, the corresponding transmission and/or reception may be performed according to the indication B.

The scheduling information is used to schedule data transmission of the resource structure, and may include single scheduling information or twice scheduling information; the single scheduling information includes complete data scheduling information, and the data channel is transmitted based on the single scheduling, and the twice scheduling information is used. The two schedules in the schedule include a part of the data scheduling information in the single scheduling information; the manner of the twice scheduling may include the following two types:

Scheduling mode 1: The first scheduling signaling includes a first part of scheduling information, and the second scheduling signaling includes a second part of scheduling information, where the data channel is sent based on the first scheduling information and the second scheduling information. For example, the first scheduling information is sent on the control channel at the beginning of the resource structure, and the second scheduling information is sent in the control channel of each basic unit (for example, a subframe and/or a TTI) in the resource structure.

Scheduling mode 2: The first scheduling signaling includes complete scheduling information, and the second scheduling signaling updates scheduling information. The update scheduling information may include: the first scheduling information is valid or invalid, and the time-frequency resource information in the first scheduling information is updated, for example, advance or push, carrier adjustment, RB resource adjustment, sub-carrier offset, etc., and the coded modulation information is updated. Update the transmission mode information, etc. Optionally, in the scheduling mode, the second scheduling information may not be sent, and the data is separately sent according to the first scheduling signaling; if the second scheduling information is sent, the scheduled information is sent according to the second scheduling information. Or, the second schedule must be sent, and the data is sent based on the first scheduling information and the second scheduling information.

The reserved resource information is used to indicate a reserved resource structure in the time-frequency resource structure, and the reserved resource structure may include: a reserved subframe, a reserved OFDM symbol, a reserved RE, a reserved subcarrier, and a reserved RB or RB. Group, or reserve one or more base units. The reserved resource in the reserved resource structure may be: the resource blank does not send a signal, or a signal reserved for the resource structure opportunity, such as a dynamic indication signal, update information, emergency signal information, auxiliary information, etc., or reserved Used to multiplex transmission of emergency service data, such as Ultra Reliable & Low Latency Communication (URLLC) service, or reserve data for scheduling other UEs, or reserved Coordination with resources between adjacent nodes, or reserved for transmitting cell-specific signals/channels, or reserved for transmitting beam/node-specific signals/channels.

3) The uplink control channel is used to transmit control information for time-frequency resource structure The control information transmitted by the uplink control channel includes at least one of the following: control channel resource information, data channel resource information, signal resource information, resource signal, indication information of time-frequency resource structure, and timing of transmitting the indication information, and scheduling information and Reserve resource information. The scheduling information is used to schedule data transmission of the resource structure, and may include single scheduling information or twice scheduling information; the single scheduling information includes complete data scheduling information, and the data channel is transmitted based on the single scheduling, and the second time The two schedules in the scheduling information respectively include partial data scheduling information in the single scheduling information.

It should be noted that the function and content of each type of information in the control information transmitted by the uplink control channel and the manner of the second scheduling may refer to the content described in the downlink control channel, and therefore, details are not described herein.

4) The downlink data channel is used for transmitting downlink service data for a time-frequency resource structure, where the downlink data channel includes at least one of the following: a downlink data channel of a single data service, and two or more different types of data services. Downstream data channel.

For a downlink data channel of a single data service, the resource structure of the downlink data channel of the single data service in the time-frequency resource structure includes at least one of the following: a time domain resource structure, a frequency domain resource structure, a spatial vector/matrix, and Relationship with the downlink control channel.

The time domain resource structure may be composed of one subframe, one TTI, multiple consecutive subframes, multiple consecutive TTIs, super TTI (e.g., composed of multiple smaller TTIs), at least one OFDM symbol, or a plurality of resource units that are not consecutive. For the case where the time domain resource structure is composed of a plurality of resource elements that are not consecutive, the spare resource unit can be used as a reserved resource for other functions, and for the unlicensed carrier, the spare resource can be used to execute the LBT.

The frequency domain resource structure may be: occupying a single frequency domain resource block or multiple frequency domain resource blocks, one or more RBs, one or more subcarriers, one or more component carriers, and one or more predefined bandwidth units; The frequency domain resource structure may be a continuous frequency domain resource structure, an interleaved resource frequency domain structure, and other discrete frequency domain resource structures. In addition, for an unlicensed carrier, the frequency domain resource bandwidth occupied by the downlink data channel is greater than or equal to 80% of the system bandwidth. The transport block (Transport Block, TB for short) carried in the downlink data channel may be a single TB or multiple TBs in the self-contained structure (for example, multiple code blocks may be multiple independent coding blocks; or the same Different coding versions of a TB, these different coding versions can be jointly decoded to improve the reliability of decoding, and can be different retransmission versions of Hybrid Automatic Repeat reQuest (HARQ), multiple TBs in Transmission on different time slots within the frequency domain resource structure, or on different frequency domain resources within the frequency domain resource structure, or on different time slots and frequency resources within the frequency domain resource structure, or a TB One or more member sub-blocks (optionally, the member sub-blocks may be self-decoded, multiple member sub-blocks are transmitted on different time slots within the frequency domain resource structure, or different frequency domain resources within the frequency domain resource structure Up-transmission, or on different time slots and frequency resources within the frequency domain resource structure, or a portion of a TB (the partial code block cannot be self-decoded and needs to be combined with other parts to be decoded).

The spatial vector/matrix can be, beam index information of the resource structure, or precoding matrix/vector, one or more ID information, one or more precoding matrices/vectors.

Relationship with the downlink control channel: The downlink data channel transmission is transmitted based on the scheduling information of the downlink control channel; the downlink data channel is mapped after the control channel, or partially/all overlaps with the downlink control channel.

For a downlink data channel of two or more different types of data services, the resource structure of the downlink data channel of the two or more different types of data services in the time-frequency resource structure includes: part or all of the resource structure corresponding to the downlink data channel of the foregoing single data service in the time-frequency resource structure.

For example, eMBB is mixed with URLLC or/and Massive Machine Type Communication (MMTC), with both puncture and superposition:

Case 1, Punch Mode: The eMBB and URLLC are mixed and transmitted between different UEs in the cell. To ensure that the data of the URLLC can be sent immediately, it may be necessary to temporarily allocate the time-frequency resources originally allocated to the eMBB to the URLLC. The modulation symbols on the eMBB corresponding to the time-frequency resources have two processing modes, namely, puncturing and low-power transmission. For eMBB services, the receiving end needs to be able to recognize and specialize the modulation symbols of this part of the time-frequency resource that is specially processed. For example, it may be identified and treated as an invalid symbol, that is, not involved in decoding processing; or explicitly notified, that is, explicit control signaling; or URLLC has a special signal identifier to facilitate receiving end identification; or receiving end blind detection, For example, in the segmentation process, it can be discriminated that a certain segment is very poor, so that it does not participate in the subsequent decoding process, or gives the segment a very low priority. For low-power transmission, it is necessary to consider explicit notification or blind detection, and the decoding of this segment signal uses Serial Interference Cancellation (SIC); that is, URLLC uses high power, so the receiving end of the eMBB can first decode and recover the URLLC signal, perform interference cancellation, and then decode the eMBB data of the segment.

Case 2, superimposed transmission: the conventional method of the time-frequency resource block in which the URLLC is located is to use high-power transmission, that is, Power Spectral Density (PSD) is high, for example, power boosting is used, thereby The time-frequency resource block has higher interference to neighboring cells than other resource blocks. In addition, for the case where the total power is limited, in order to obtain the frequency diversity gain, a resource element (Resource Element, referred to as RE) which is sparsely frequency-domain interleaved is more suitable; since the resource unit (RE) is sparse, each occupied RE The PSD is boosted, so that the relative continuous occupancy fully utilizes the frequency domain diversity gain, and CDMA can obtain better interference diversity gain; if the RE interleaving resource is used, for the uplink data transmission, it is necessary to consider how to properly allocate resources to prevent collisions with each other. Avoid scheduling delays caused by precise scheduling, such as resource pre-allocation. It should be noted that the time domain and/or frequency domain diversity, that is, the next resource sub-block adopts frequency domain frequency hopping, thereby obtaining better diversity gain.

Compared with the self-contained subframe structure in the prior art, the self-contained structure in the embodiment of the present disclosure is more advantageous for processing the resource coordination problem of the mixed eMBB and the URLLC:

Specifically, since the TB of the eMBB is large, the processing time is relatively long; and, in order to pursue spectrum efficiency, the processing time of the multi-UE scheduling is also long. The URLLC has a small TB size, and the encoding processing time and resource allocation time are relatively short. Therefore, the eMBB does not know that the data of the URLLC user needs to be transmitted during encoding and scheduling, so that the relationship between the two can be coordinated only when the resource is mapped, that is, the above processing manner is adopted.

When the URLLC and the eMBB are mixed and transmitted, the problem of the service conflict with the URLLC can be solved by dynamically delaying the eMBB transmission resource mapping location. For example, in the case that the URLLC is mapped to the beginning of the resource used by the eMBB, the offset is added to the time domain of the eMBB resource mapping, and the eMBB service data is sent after a certain time delay, thereby ensuring On the other hand, for the case where the URLLC is mapped in the middle of the resources used by the eMBB, the eMBB resource is segmented, the URLLC is inserted in the middle, and the URLLC is transmitted before the eMBB is transmitted, that is, in the resource structure of the eMBB. Allows dynamic insertion of URLLC transmissions, and the resources used by the eMBB's own transmission can be delayed for a certain period of time at a predefined segment boundary, and then continue to transmit the remaining eMBB TBs, thereby ensuring the integrity of the eMBB TB.

In an actual application, if a time offset is added to the time domain of the eMBB resource mapping, one or more notification receiving ends may be adopted in the following manner: the eMBB channel has a start identifier, which facilitates blind detection at the receiving end; Notification; the receiving end blindly checks the URLLC, thereby indirectly obtaining the time domain offset of the eMBB. In addition, for the manner in which the URLLC is detected, since the mode in which the URLLC is mixed with the eMBB can be configured, the URLLC location can be mapped more flexibly. For example, the receiving end of the eMBB (for example, the UE, the base station) can assume that there may be a URLLC hybrid. In the case, the URLLC candidate resource block is blindly checked for the presence of the URLLC, and then the TB of the eMBB is detected. Further, in order to facilitate the detection of the URLLC, identification information, such as a preamble sequence, may be added at the beginning and/or the middle of the URLLC channel, and the receiving end may detect the identifier and identify the URLLC channel.

Further, one or more small time slots are configured in the middle of the eMBB time slot, and the base station can detect and/or detect whether other cells have URLLC transmission in the small time slot. The base station may adjust the presence or absence of the neighboring cell URLLC service and/or the neighboring cell URLLC signal exceeds a predefined threshold, and the manner of adjusting the eMBB being transmitted may be at least one of the following:

1) stopping the transmission of the eMBB;

2) adopting a method of punching a resource location corresponding to the URL of the eMBB service in the neighboring cell URLLC;

3) adopting a method of superimposing and transmitting with a neighboring cell URLLC service, but the base station reduces the transmission power of the eMBB. The method for reducing the eMBB power may be at least one of the following: only reduce the transmit power of the eMBB on the resource location corresponding to the neighbor cell URLLC; or the resource location corresponding to the neighbor cell URL LC until the eMBB current time The transmission power of the eMBB on all transmission resources of the resource location at the end of the transmission;

4) The base station transmitting the eMBB notifies the URLLC base station that its eMBB conflicts with its URLLC. The URLLC base station may perform a URLLC retransmission operation or an interference cancellation operation based on the information, or may not participate in the merge decoding for the conflicted URLLC transmission when retransmitting the merge.

5) The downlink signal is used to assist in transmitting downlink data services for the time-frequency resource structure, and the downlink signal may include at least one of the following: a UE-specific demodulation reference signal, a reference signal specific to the time-frequency resource structure, and a time The channel information reference signal specific to the frequency resource structure, the preamble signal specific to the time-frequency resource structure, and the identification signal specific to the time-frequency resource structure, and the cell-specific reference signal, the beam-specific reference signal, and the node-specific reference signal.

The UE-specific demodulation reference signal is used for channel demodulation in the resource structure.

A reference signal specific to the resource structure for channel estimation of the resource structure. For example, detecting the presence or absence of the resource structure based on the reference signal, or synchronizing for the resource structure, or channel information measurement for the resource structure, or interference measurement for the resource structure, or for resource unit Channel demodulation, or used to identify/identify the resource structure. Optionally, each resource structure appears, or a semi-static indication is present, or a dynamic indication is generated.

A channel information reference signal specific to the resource structure, used for channel estimation of the resource structure, for channel information measurement of the resource structure, or for identifying/identifying the resource structure. Optionally, each resource structure appears, or a semi-static indication is present, or a dynamic indication is generated.

A preamble signal specific to the resource structure, for example, detecting the presence or absence of the resource structure based on the preamble signal, or synchronizing for the resource structure, or channel information measurement for the resource structure, or interference measurement for the resource structure Or for channel demodulation of resource elements or for identifying/identifying the resource structure. Optionally, each resource structure appears, or a semi-static indication is present, or a dynamic indication is generated.

The identification signal specific to the resource structure can be used, for example, to identify the resource structure, so that the UE can detect and identify. Optionally, each resource structure appears, or a semi-static indication is present, or a dynamic indication is generated.

The cell-specific reference signal, for example, the cell-specific reference signal transmitted by the opportunity, is not sent separately, but is transmitted along with the resource structure; or the reference signal specific to the non-periodic cell triggers transmission in the resource structure; or cycle/ The non-periodic cell-specific reference signal continues to transmit the reference signal specific to the cell when the time-frequency and/or spatial resources are in the self-contained structure; the time-frequency and/or spatial resources occupied by the reference signal do not map the resource structure itself. Signal/channel, or signal/channel that maps the resource structure itself.

The beam-specific reference signal, for example, the beam-specific reference signal transmitted by the opportunity, is not sent separately, but is transmitted along with the resource structure; or the non-periodic beam-specific reference signal is triggered to be transmitted in the resource structure; or cycle/The non-periodic beam-specific reference signal continues to transmit the reference signal specific to the beam when the time-frequency and/or spatial resources are in the self-contained structure; the time-frequency and/or spatial resources occupied by the reference signal do not map the resource structure itself. Signal/channel, or signal/channel that maps the resource structure itself.

The node-specific reference signal, for example, the node-specific reference signal sent by the opportunity, is not sent separately, but is sent along with the resource structure; or the reference signal specific to the non-periodic node triggers transmission in the resource structure; or cycle/The non-periodic node-specific reference signal continues to transmit the reference signal specific to the node when the time-frequency and/or spatial resources are in the self-contained structure; the time-frequency and/or spatial resources occupied by the reference signal do not map the resource structure itself. Signal/channel, or signal/channel that maps the resource structure itself.

6) The uplink control channel is further configured to transmit the HARQ-ACK/NACK feedback information corresponding to the resource structure of the PDSCH, and the control information transmitted by the uplink control channel may further include at least one of the following: uplink data. The scheduling information of the channel, the index relationship corresponding to the pre-scheduling, and the index relationship corresponding to the semi-persistent scheduling.

In practical applications, the time-frequency resource structure may be used in at least one of a self-scheduling scenario, a pre-scheduled scenario, and a semi-persistent scheduling scenario. For the self-scheduling scenario, the uplink control information transmitted by the uplink control channel may include scheduling information of the uplink data channel. For the pre-scheduled scenario, the uplink control information may include an index relationship corresponding to the pre-scheduling, and the receiving end may obtain corresponding information according to the uplink control information. Scheduling information; for a semi-persistent scheduling scenario, the uplink control information may include an index relationship corresponding to the semi-persistent scheduling, and the receiving end may obtain corresponding scheduling information according to the uplink control information.

7) The uplink data channel is used for transmitting uplink service data for a time-frequency resource structure, where the uplink data channel includes at least one of the following: an uplink data channel of a single data service, and two or more different types of data services. Upstream data channel.

For an uplink data channel of a single data service, the resource structure of the uplink data channel of the single data service in the time-frequency resource structure includes at least one of the following: a time domain resource structure, a frequency domain resource structure, a spatial vector/matrix, and Relationship with the uplink control channel.

For an uplink data channel of two or more different types of data services, the resource structure of the uplink data channel of the two or more different types of data services in the time-frequency resource structure includes: part or all of the resource structure corresponding to the downlink data channel of the foregoing single data service in the time-frequency resource structure.

It should be noted that the specific content of each resource structure in the uplink data channel and the manner of processing the data may refer to the content described in the downlink data channel, and therefore will not be further described herein.

In the embodiment of the present disclosure, a method for configuring hybrid transmission of different service channels is configured; and the traffic transmission is performed according to the configured method for hybrid transmission of different services.

In an embodiment, the UE and/or the base station configure a slot interval during the enhanced mobile broadband eMBB transmission, the slot interval being used to detect the secondary indication adjustment information or the multi-level indication adjustment information.

In another embodiment, the UE and/or the base station configure a slot interval during eMBB transmission, the slot interval being used to measure sensed interference information.

In another embodiment, the UE and/or the base station configure a slot interval during eMBB transmission, which is used to measure ultra-high reliability and ultra-low latency communication URLLC transmission information for sensing other UEs and/or base stations.

In another embodiment, the UE and/or the base station measure traffic transmission information of other UEs and/or base stations before URLLC transmission, and the traffic transmission information includes at least one of the following: URLLC transmission information, eMBB transmission information, and mass information. Networked communication mMTC transmits information.

In another embodiment, the URLLC identification information is sent at a predetermined time interval between URLLC transmissions.

Specifically, for the uplink data channel hybrid transmission of two or more different types of data services, the resource structure of the uplink data channel of the two or more different types of data services in the time-frequency resource structure includes: The uplink data channel of two or more different types of data services is mixedly transmitted in part or in whole of the resource structure in the time-frequency resource structure.

For example, eMBB and URLLC or/and Massive Machine Type Communication (MMTC) channel mixed transmission, can adopt at least one of the following two ways: puncture and superposition:

Mode 1, puncturing mode: eMBB and URLLC mixed transmission between different UEs in a cell. To ensure that the data of the URLLC can be sent immediately, it may be necessary to temporarily allocate the time-frequency resources originally allocated to the eMBB to the URLLC. The modulation symbols on the eMBB corresponding to the time-frequency resources have two processing modes, namely, puncturing and low-power transmission. For eMBB services, the receiving end needs to be able to recognize and specialize the modulation symbols of this part of the time-frequency resource that is specially processed. For example, it may be identified and treated as an invalid symbol, that is, not involved in decoding processing; or explicitly notified, that is, explicit control signaling; or URLLC has a special signal identifier to facilitate receiving end identification; or receiving end blind detection, For example, in the segmentation process, it can be discriminated that a certain segment is very poor, so that it does not participate in the subsequent decoding process, or gives the segment a very low priority. For low-power transmission, it is necessary to consider explicit notification or blind detection, and the decoding of this segment signal uses Serial Interference Cancellation (SIC); that is, URLLC uses high power, so the receiving end of the eMBB can first decode and recover the URLLC signal, perform interference cancellation, and then decode the eMBB data of the segment.

Mode 2, superimposed transmission: the conventional method of the time-frequency resource block in which the URLLC is located is to use high-power transmission, that is, the Power Spectral Density (PSD) is high, for example, power boosting is used, thereby The time-frequency resource block has higher interference to neighboring cells than other resource blocks. In addition, for the case where the total power is limited, in order to obtain the frequency diversity gain, a resource element (Resource Element, referred to as RE) which is sparsely frequency-domain interleaved is more suitable; since the resource unit (RE) is sparse, each occupied RE The PSD is boosted, so that the relative continuous occupancy fully utilizes the frequency domain diversity gain, and CDMA can obtain better interference diversity gain; if the RE interleaving resource is used, for the uplink data transmission, it is necessary to consider how to properly allocate resources to prevent collisions with each other. Avoid scheduling delays caused by precise scheduling, such as resource pre-allocation. It should be noted that the time domain and/or frequency domain diversity, that is, the next resource sub-block adopts frequency domain frequency hopping, thereby obtaining better diversity gain.

Compared with the self-contained subframe structure in the prior art, the self-contained structure in the embodiment of the present disclosure is more advantageous for processing the resource coordination problem of the mixed eMBB and the URLLC.

Specifically, since the TB of the eMBB is large, the processing time is relatively long; and, in order to pursue spectrum efficiency, the processing time of the multi-UE scheduling is also long. The URLLC has a small TB size, and the encoding processing time and resource allocation time are relatively short. Therefore, the eMBB does not know that the data of the URLLC user needs to be transmitted during encoding and scheduling, so that the relationship between the two can be coordinated only when the resource is mapped, that is, the above processing manner is adopted.

When the URLLC and the eMBB are mixed and transmitted, the problem of the service conflict with the URLLC can be solved by dynamically delaying the eMBB transmission resource mapping location. For example, in the case that the URLLC is mapped to the beginning of the resource used by the eMBB, the offset is added to the time domain of the eMBB resource mapping, and the eMBB service data is sent after a certain time delay, thereby ensuring On the other hand, for the case where the URLLC is mapped in the middle of the resources used by the eMBB, the eMBB resource is segmented, the URLLC is inserted in the middle, and the URLLC is transmitted before the eMBB is transmitted, that is, in the resource structure of the eMBB. Allows dynamic insertion of URLLC transmissions, and the resources used by the eMBB's own transmission can be delayed for a certain period of time at a predefined segment boundary, and then continue to transmit the remaining eMBB TBs, thereby ensuring the integrity of the eMBB TB.

In an actual application, if a time offset is added to the time domain of the eMBB resource mapping, one or more notification receiving ends may be adopted in the following manner: the eMBB channel has a start identifier, which facilitates blind detection at the receiving end; Notification; the receiving end blindly checks the URLLC, thereby indirectly obtaining the time domain offset of the eMBB. In addition, for the manner in which the URLLC is detected, since the mode in which the URLLC is mixed with the eMBB can be configured, the URLLC location can be mapped more flexibly. For example, the receiving end of the eMBB (for example, the UE, the base station) can assume that there may be a URLLC hybrid. In the case, the URLLC candidate resource block is blindly checked for the presence of the URLLC, and then the TB of the eMBB is detected. Further, in order to facilitate the detection of the URLLC, identification information, such as a preamble sequence, may be added at the beginning and/or the middle of the URLLC channel, and the receiving end may detect the identifier and identify the URLLC channel.

Further, one or more small time slots are configured in the middle of the eMBB time slot, and the base station can detect and/or detect whether other cells have URLLC transmission in the small time slot. The base station may adjust the presence or absence of the neighboring cell URLLC service and/or the neighboring cell URLLC signal exceeds a predefined threshold, and the manner of adjusting the eMBB being transmitted may be at least one of the following:

(1) stopping the transmission of the eMBB;

(2) adopting a method of punching a resource location corresponding to the URL of the eMBB service in the neighboring cell URLLC;

(3) A method of superimposing and transmitting with a neighboring cell URLLC service, but the base station reduces the transmission power of the eMBB. The method for reducing the eMBB power may be at least one of the following: only reduce the transmit power of the eMBB on the resource location corresponding to the neighbor cell URLLC; or the resource location corresponding to the neighbor cell URL LC until the eMBB current time The transmission power of the eMBB on all transmission resources of the resource location at the end of the transmission;

(4) The base station transmitting the eMBB notifies the URLLC base station that its eMBB conflicts with its URLLC. The URLLC base station may perform a URLLC retransmission operation or an interference cancellation operation based on the information, or may not participate in the merge decoding for the conflicted URLLC transmission when retransmitting the merge.

8) The uplink signal may include at least one of the following signals: an uplink preamble signal, an uplink demodulation reference signal, and an uplink channel sounding reference signal (Sounding Reference Signal, referred to as: SRS signal); the uplink preamble signal is preferentially mapped. The starting position of the resource structure can be used to synchronize and/or detect the presence or absence of an uplink signal and/or identify the UE.

Further, for the above five structures of the time-frequency resource structure in the embodiment of the present disclosure, the time sequence of the components in the time-frequency resource structure may be different, and the structure III is taken as an example: the structure III is a time-frequency resource structure. The downlink control channel, the downlink data channel, the downlink signal, and the uplink control channel and the uplink signal, the time sequence of the structure may be at least one of the following:

Case 1. The time sequence of the composition is: first, mapping the downlink signal and the downlink channel, and then mapping the uplink signal and the uplink channel.

Case 2: The time sequence of the composition is: first, the uplink signal and the uplink channel are mapped, and then the downlink signal and the downlink channel are mapped.

Case 3: The time sequence of the composition is: firstly mapping the downlink control channel and the downlink signal, then mapping the uplink signal, then mapping the downlink data channel and the downlink signal, and then mapping the uplink control channel and the uplink signal.

Case 4: The time sequence of the composition is: firstly mapping the downlink control channel, the downlink data channel, and the downlink signal, and then retaining a part of the reserved time slot in the middle, and then mapping the uplink control channel and the signal. The reserved time slot in the middle can be used to multiplex other channel signals, and can also allow the UE to have more processing time to complete downlink data demodulation and decoding, and generate an ACK/NACK message.

In the above various cases, for the time-frequency resource structure of a certain structure, the time sequence of different components, the order of processing by the receiving end is different, so that different processing effects can be achieved at the receiving end.

For example, the chronological order of the components of the time-frequency resource structure may include, for example:

1. PDCCH+PUSCH+PDSCH+PUCCH;
2. PDCCH+PUSCH/SRS+PDSCH+PUCCH;
3. PDCCH+PDSCH+SRS+PUCCH;
4. PDCCH+PDSCH+Gap+SRS+PUCCH;
5. PDCCH+PDSCH+Blank slot+SRS+PUCCH.

The PDCCH is a physical downlink control channel (Physical Downlink Control Channel), the PUSCH is a physical uplink shared channel (Physical Downlink Shared Channel), and the PUSCH is a physical downlink shared channel (Physical Downlink Shared Channel), and the PUCCH is a physical uplink control channel (Physical Uplink Control Channel), SRS is a Sounding Reference Signal, Gap is a reserved time slot, and Blank slot is a blank gap.

Optionally, the foregoing time-frequency resource structure may include at least one of the foregoing structure 1 to structure 5. In addition to the foregoing five structures, the time-frequency resource structure in the embodiment of the present disclosure may further include the following structure. At least one of the following: a resource structure specific to the SRS, a resource structure specific to the uplink discovery signal UL DRS, a resource structure specific to the Physical Random Access Channel (PRACH), and a channel state information reference symbol (Channel State Information Reference Symbol, referred to as: CSI-RS) unique resource structure.

The SRS-specific resource structure is configured to configure a unique slot/subframe for SRS transmission, and SRSs of different UEs in the cell may be configured in the resource structure specific to the SRS. In addition, for the aperiodic SRS, the trigger information may also be included, and the aperiodic SRS is triggered to be sent in a self-contained structure, and the trigger information is notified to the UE, and the UE sends the aperiodic SRS according to the trigger information.

The resource structure specific to the uplink discovery signal (UL-DRS) is that the unique slot/subframe is configured for UL-DRS transmission, and the UL-DRS of different UEs in the cell can be configured in the resource structure specific to the UL-DRS. For example, the method may include: a periodic UL-DRS, an aperiodic UL-DRS; the UL-DRS may include at least one of an SRS, a PRACH, and a preamble; the information carried by the UL-DRS signal may include UE-ID information, synchronization information. At least one of resource occupancy information and resource request information.

The PRACH-specific resource structure can include at least one of the following characteristics:

1. The PRACH-specific resource structure can be used to transmit non-competitive PRACH and/or competing PRACH;
2. Different UEs can share the resource structure specific to the PRACH;
3. Has a unique slot/subframe/RB;
4. The relationship with other channel signals may be at least one of the following modes: orthogonal to each other, that is, PRACH-specific resources are not scheduled to transmit other signals and/or channels; PRACH-specific resources are scheduled to be transmitted non-competitively. For the PRACH, the resource is no longer scheduled to send other signals and/or channels; if the PRACH-specific resource is scheduled to send the contention PRACH, the resource may not schedule to transmit other signals and/or channels.

The CSI-RS-specific resource structure may include CSI-RS transmission and corresponding CSI feedback; for example, for a periodically transmitted CSI-RS, the resource structure includes one period of CSI-RS signal, based on the one-cycle CSI-RS The measurement, and the feedback of the measured CSI; for example, for the aperiodic CSI-RS, the trigger information may also be included, and the triggering of the aperiodic CSI-RS is sent in a self-contained structure, and the trigger information is notified to the UE, and the UE is The aperiodic CSI-RS measures CSI and feeds back to the base station within the same self-contained structure as the aperiodic CSI-RS.

Further, on the basis of the five structures of the time-frequency resource structure and the foregoing various resource structures, the time-frequency resource structure in the embodiment of the present disclosure further includes at least one of the following structures: reserved resources. The structure and the sensed resource structure; wherein the reserved resource structure comprises: a reserved subframe, a reserved orthogonal frequency division multiplexing OFDM symbol, a reserved element RE, a reserved subcarrier, a reserved resource block RB or an RB group.

The reserved resource structure is used to indicate the basic unit reserved in the time-frequency resource structure. The structure and function of the reserved resource structure have been described in detail above, and therefore are not described herein. It should be noted that reserved resources have the following characteristics:

1. The reserved resource is fixedly configured and/or defaulted, or is the semi-static configuration present, or dynamically indicated whether it appears;
2. Reserve a fixed configuration of resources and/or default one or more uses, or semi-statically configure one or more uses, or dynamically indicate one or more uses.
3. Reserve resources. For the case of time domain resources, priority is placed at the beginning and/or end of the resource structure, or at the beginning and/or end of the subframe. For the case of frequency domain resources, it can be configured at the RB boundary, or RBG boundary, or member carrier sideband, or predefined frequency domain location.

The configuration of the sensed resource structure may be used to solve the coexistence problem in the self-contained structure. The sensed resource structure may include time domain resources and frequency domain resources, wherein the time domain resources include time slots in the time domain, and the frequency domain resources include RBs and REs, subcarrier or component carrier.

The foregoing describes in detail the structural content of the self-contained structure configured in the embodiment of the present disclosure. The self-contained structure is composed of one or more basic units, and the configuration of the self-contained structure includes at least one of the following:

In configuration mode 1, the dynamic indication message or the semi-static indication message is used to indicate the resource content of the subframe in the self-contained structure, that is, the presence or absence of the subframe resource.

For example, the self-contained structure is composed of multiple subframes, and one or more subframes constituting the self-contained structure may be configured as a full downlink or a full uplink. For the scenario configured as full downlink, the uplink time slot and/or the handover interval time slot indicating the subframe does not exist; or the uplink time slot and/or the handover interval time slot indicating the subframe are not signaled. For a scenario configured as a full uplink, the downlink time slot and/or the handover interval time slot indicating the subframe does not exist; or the downlink time slot and/or the handover interval time slot indicating the subframe are not signaled.

In the configuration mode 2, the time slot of the self-contained structure is used to transmit a dynamic indication message, where the time slot includes at least one of an uplink time slot and a downlink time slot, where the dynamic indication message includes a channel dynamic indication message and a signal dynamic indication message. At least one of them.

For example, the self-contained structure has a plurality of subframes, and an uplink time slot may indicate uplink control information (UPI) or may transmit an SRS signal. A downlink time slot, which can be configured to transmit downlink control information (Downlink Control Information, DCI for short) or a transmission reference signal and/or a preamble signal.

In configuration mode 3, a part of the subframes or basic units in all the basic units of the self-contained structure are used for a dedicated resource set, where the dedicated resource set includes at least one of an uplink dedicated resource set and a downlink dedicated resource set. Resources other than these dedicated resource sets (e.g., subframes/slots/other predefined base units) can be dynamically used for other general uplink and downlink signal/channel transmissions. When the predefined resource overlaps (or multiplexes) with the dynamic scheduling resource, the signal/channel carried by the predefined resource transmits the high priority service data, including one of the following: the DL/UL attribute is determined by the attribute of the predefined resource; Priority mapping/transmission of the channel/signal specific to the predefined resource; at least one of the following parameters are determined according to parameters of the predefined resource: power value, antenna port, sequence used for channel/signal, precoding vector/matrix, beam Affiliation (a scenario where precoding is required for public information).

It should be noted that if a signal/channel with a higher priority requires resource transmission, the processing manner of the low priority service being transmitted includes at least one of the following: abandoning the transmission of the low priority service being transmitted; The class service can be configured to perform segmented transmission, for example, to complete the transmission of one or more sub-segments, suspend transmission of subsequent sub-segments, perform higher-priority traffic transmission, and then continue to transmit unsuccessful sub-segments with lower priority, usually need to configure the mechanism of segmentation transmission.

When the DL/UL is switched to the cell level and/or the node level, it may affect other UEs in the current cell/local node, and the manner of notifying or reconfiguring the DL/UL may include: displaying a signaling indication, for example, by using a broadcast channel. Notifying multiple UEs at the same time; or notifying a specific UE through a UE-specific channel, or notifying a group of UEs through a multicast channel; implicit indication, for example, by UE detection.

In addition, for the side link of the direct communication of the UE, since the communication is mainly Peer to Peer (P2P) communication, the transmission and reception switching is easier, specifically:

For the downlink, the UE blinds whether the low priority service is continuing to transmit, or based on the identification signal identifying whether the low priority service continues to be transmitted, or by DCI notification.

For the uplink, the segment aware resource is configured, and the UE may detect whether the eNB performs DL/UL handover on the sensed resource.

For the side link, the segment aware resource is configured, and the UE can detect whether the DL/UL switch is performed on the side link of the sensed resource.

The segmented time slot may have a certain overlap with the segmented sub-block resource being transmitted. If DL/UL or transceiving handover occurs, the sub-segment data in the sub-block resource overlapping with the handover interval slot resource is retransmitted./receive. The role of configuration segmentation is: dynamic handover is a small probability event. If the handover interval is reserved without utilization, unnecessary resource overhead/wasting will be incurred.

In configuration mode 4, the self-contained structure is also configured with a self-contained subframe structure for enhancing UCI coverage. For one UE, its uplink and downlink frequency domains may be discontinuous. For example, the DL time slot of UE1 (occupying OFDM symbols 0-6, transmitting PDSCH) occupies RB1~RB10, the UL time slot (occupying OFDM symbols 7~13, transmitting UCI) can occupy RB11; the UL time slot of UE2 (occupying OFDM symbol) 7~13, transmitting PUSCH) occupies RB12~RB20, DL time slot (occupying OFDM symbol 0~6, transmitting DCI) can occupy RB11. That is, the uplink occupies more OFDM symbols to ensure coverage. In order not to waste resources, it can be multiplexed with the PUSCH frequency of other UEs, and the PUSCH occupies more RB resources.

It should be noted that the embodiment of the present disclosure adopts a self-contained structure to deal with the coexistence problem, and mainly considers the following aspects: inter-cell interference problem, which mainly includes the same-frequency scenario and the adjacent-frequency scenario, and can adopt the situation of the neighboring cell slot occupancy. Then, it is determined whether to perform time slot switching of the own cell to handle inter-cell interference. The uplink and downlink interference problem between different UEs in the small area may be handled by using the uplink and downlink time slot relationship alignment principle between different UEs. For the dynamic subframe type selection, the handover may be performed by selecting a certain type of subframe structure, selecting the type selection based on the post-perception selection, or based on the uplink and downlink slot relationship alignment principles between different UEs.

For example, each base unit reserves a sensed resource:

For the DL, the UE's sensed resource is in the initial position of the DL sub-frame structure, that is, within a time window from the DL start boundary to Δt1, that is, it can determine whether there is downlink data transmission at the beginning of the downlink subframe, thereby judging Whether it can be used for uplink occupation and transmission;

For the UL, the eNB's sensed resource is in the initial position of the UL subframe structure, that is, within a time window from the UL start boundary to Δt2, that is, it can determine whether there is downlink data transmission at the beginning of the uplink subframe, thereby judging whether uplink occupancy and transmission can be achieved.

The sensing object may include at least one of the following: a local cell signal, a co-frequency neighbor cell signal, and an adjacent frequency signal. For the adjacent frequency signal, the eNB/UE can measure the uplink and downlink occupancy of the adjacent frequency at the adjacent frequency point, thereby determining the configuration of the uplink and downlink transmission of the local cell. For the same-frequency/adjacent-frequency measurement sensing of the neighboring cell, the predefined threshold is configured. If the threshold is exceeded, it cannot be occupied. If the threshold is not exceeded, it can be occupied. The same frequency or adjacent frequency can be configured with the same or different predefined thresholds.

It should be noted that the following types of frame structure types of the Licensed-Assisted Access (LAA) in the prior art have the following problems:

Question 1, whether there is blind detection of CRS in the burst structure when the test passes, there may be missed detection or false alarm, and performance cannot be guaranteed. The method for solving the problem in the embodiment of the present disclosure may be as follows. A preamble signal may be added to a start position of the burst structure, so that the receiving end can detect the presence and/or start of the burst structure; the preamble signal can be used for synchronization and/or channel estimation. In order to further ensure the detection performance, the preamble signal may be sent in the initial configuration of multiple basic units in the time-frequency resource structure, so that even if there is a miss detection/error detection at the starting position, the subsequent resource location of the time-frequency resource structure may also be detected, avoiding the entire time-frequency resource structure from not being detected and received; or, the indication information is sent at the beginning of the time-frequency resource structure, indicating at least one of the duration of the structure, the structure type, and the time-frequency resource structure; or, other channels dynamically or semi-statically indicate/configure the time-frequency resource structure; or, other channels dynamically or semi-statically indicate/configure candidate locations of the time-frequency resource structure.

Question 2, dynamic DCI can only indicate the structure information of the current and/or next subframe. The method for solving the problem in the embodiment of the present disclosure may be: the start position indicates the current time-frequency resource structure, including the duration, the specific subframe structure; and/or each subframe indicates the structure of the current subframe and the subsequent subframe. The subframe structure information may include at least one of the following: a subframe type, an uplink or downlink attribute, an uplink or downlink switching time point, a channel and/or a signal structure, an occupied duration, a blank, and/or a CCA slot.

Problem 3, Pre-configured and/or semi-persistently scheduled common subframe/slot/RB, the scheduled common subframe/slot/RB cannot be used for other signal and/or signal transmission unless there is special control information indication. The method for solving the problem in the embodiment of the present disclosure may be that the scheduled common subframe/slot/RB may be used to transmit at least one of the following signals and/or channels: DRS, UL-DRS, SRS, PBCH, PRACH, common control channel, public multicast channel.

Problem 4: The high-priority deterministic transmission of the publicly-available carrier is authorized to ensure the quality of service (Quality of Service, QoS for short); the uncertainty of the unlicensed carrier is not guaranteed for the QoS of the transmission. The existing problem of Time Division Duplexing (TDD) is that the mutual interference problem between UL-DLs cannot be solved. The embodiment of the present disclosure can solve the problem by adopting at least one of the following manners:

Using CCA/LBT to solve the problem of dynamic TDD, the DL/UL time slot of the middle-frequency frame of the time-frequency resource structure may collide with other cells or other UEs, reserve the sensed resource structure in the time-frequency resource structure, and perform CCA/LBT on the sensed resource. That is, the coexistence problem can be solved by configuring the sensed resources.

A node (which may be at least one of a UE, a base station, a transmission point) broadcasts its DL/UL slot information, and other nodes may detect this information for its reference using DL/UL if the node If there is a conflict with other nodes, at least one of the following processing modes may be adopted: stopping the transmission of the signal/channel following the time-frequency resource structure; detecting whether the signals of other nodes in the collision can be simultaneously transmitted, and if so, continuing to transmit. a subsequent signal channel of the time-frequency resource structure; if not, stopping the subsequent signal/channel transmission of the time-frequency resource structure; detecting the priority of the signal of the other node in conflict, if the priority of the conflict signal is lower, continuing to transmit The subsequent signal channel of the time-frequency resource structure; if the conflicting signal has a high priority, the subsequent signal/channel transmission of the time-frequency resource structure is stopped.

Further, the type of the self-contained structure in the embodiment of the present disclosure may include at least one of the following: a UE-specific self-contained structure, a cell-specific self-contained structure, a node-specific self-contained structure, and a beam-specific self-contained structure. And carrier-specific self-contained structure. Explain these different types of self-contained structures separately:

1) HE-specific self-contained structure, including: control channel, traffic channel, UE-specific reference signal, HARQ feedback, UE-specific ID information, sequence;

Support UE-centric scheduling: different nodes, different carriers;

Support flexible multiplexing of different types of services: eMBB, URLLC, etc.

2) Cell-specific self-contained structure, including: DRS, PSS/SS, Physical Broadcast Channel (PBCH), CRS, Master Information Block (MIB)/SIB, etc. The cell-specific self-contained resource structure may occur non-periodically, or periodically, preferably periodically.

The UE can obtain relatively complete cell information through the cell-specific self-contained structure. Compared with the self-contained subframe structure in the prior art, the cell information such as cell discovery, basic synchronization, and broadcast information is concentrated in the cell-specific self-contained. In the structure.

Optionally, the cell-specific self-contained structure may further include measurement feedback of the UE. Among them, PSS/SS, PBCH, etc. do not require UE feedback, and only downlink transmission is equivalent to having completed the complete transmission process, forming a self-contained structure.

3), node-specific self-contained structure: a node in the cell, a node in the CoMP, a node in the UDN, etc., the composition and function are similar to the self-contained structure specific to the cell, but constitute a self-contained structure from the node-specific information perspective.

4) Beam-specific self-contained structure: one beam in the cell, one beam in Messave MIMO, the composition and function are similar to the cell-specific self-contained structure, but constitute a self-contained structure from the beam-specific information perspective.

5) A carrier-specific self-contained structure: a component carrier in a similar cell, a carrier in the CA, including: whether there is no more independent cell ID, and multiple component carriers form a virtual carrier, which together constitute a cell system bandwidth, Support flexible and variable system bandwidth; the composition and function are similar to the cell-specific self-contained structure, but constitute a self-contained structure from the perspective of the unique information of the virtual component carrier.

The above describes in detail the components of the self-contained structure in the embodiment of the present disclosure. The following describes the time-frequency location of the self-contained structure. The time-frequency resource structure of the self-contained structure includes at least one of the following:

The first type includes a continuous time-frequency resource in the self-contained structure;

Second, the self-contained structure includes resources that are continuous in the frequency domain and discontinuous in the time domain;

Third, the self-contained structure includes resources that are discontinuous in frequency domain and continuous in time domain;

Fourth, the self-contained structure includes resources in which the frequency domain is discontinuous and the time domain is discontinuous.

The time zone discontinuous resource may be: a discontinuous resource of a fixed time interval; or a non-contiguous resource of a pre-configured maximum or minimum time interval range, where the minimum time interval may be 0, and the time interval unit may be as follows At least one of: one or more CCA minimum time slots, one or more OFDM symbols, one or more time slots, one or more TTIs, one or more subframes, one or more radio frames.

For example 1, for an unlicensed carrier scenario, the duration of the continuous occupation is limited by the MCOT, and a self-contained structure may be composed of multiple MCOTs that are not consecutive.

In example 2, multiple sub-blocks of a TB are respectively transmitted on a time-domain discontinuous resource of a self-contained structure, wherein each part of the resource maps one or more sub-blocks respectively.

In example 3, a word containing structure data transmission and corresponding HARQ-ACK/NACK are respectively configured to be transmitted on different resources of a self-contained structure whose time domain is discontinuous. The time domain is not continuous resources, and the time interval can provide more processing time of the receiving end to complete demodulation decoding of the data and feed back HARQ-ACK/NACK.

The resources with discontinuous frequencies may be: one or more subcarriers, one or more RBs, one or more RB groups, and one or more component carriers.

Different time domain units constituting a self-contained structure (including one or more CCA minimum time slots, one or more OFDM symbols, one or more time slots, one or more TTIs, one or more subframes, one or more Radio frames) can be different frequency domain resources. The time domain units must be the same frequency resource before and after a self-contained structure, which can provide flexibility in resource allocation and provide frequency diversity effects.

In example 1, the first subframe occupies RB0~RB5; the second subframe occupies RB20~RB25.

In example 2: Different time units use frequency hopping to perform frequency hopping according to a predefined frequency hopping pattern.

It should be noted that the attributes of the self-contained structure in the embodiment of the present disclosure may include at least one of the following:

1) A self-contained structure for sharing a common channel in a cell, the self-contained structure for transmitting at least one of the following information: a cell system broadcast information, a discovery signal, a synchronization signal, a cell reference signal, and a positioning reference signal. The structure has at least one of the following characteristics:

The structure usually has a higher priority. When other channels/signal resources collide, the priority transmission can be configured. This type of information is more critical, so higher priority transmission is required.

Preferably, the configuration is periodically generated, which may be beneficial to the UE or other nodes to detect;

Preferably, it is configured in the middle of the system bandwidth, which is beneficial to the UE or other nodes to detect;

It is configured on the predefined subband to facilitate UE or other node detection.

The configuration is performed on one or several specific carriers in the carrier group, and the other carriers in the carrier group are not transmitted. The method is applicable to a carrier group having a common attribute, and the public attribute information may be transmitted by one or several carriers, only part of Carrier transmission can also save overhead;

The configuration is transmitted on one or several specific nodes in the node set, and other nodes in the node set are not transmitted. The method is applicable to a set of nodes having common attributes, and one or several nodes may transmit public attribute information. Only partial node transfers can also save overhead.

2) Self-contained structure shared by multiple nodes

A plurality of UEs in a cell share a self-contained resource structure to transmit an SRS, and SRSs of different UEs occupy different time-frequency resources and/or sequence resources of the self-contained structure, that is, time division multiplexing or frequency multiplexing or code division multiplexing. For example, for an unlicensed carrier, the minimum duration of one time exceeds the duration of a single SRS signal, and the SRSs of multiple UEs can be configured to be sent in the self-contained structure, so that the total occupation time can meet the minimum occupation time requirement of the unlicensed carrier.

A plurality of nodes may superimpose the transmitted self-contained structure, which allows a group of nodes to be configured/scheduled to be superimposed and transmitted on the time-frequency resources of the self-contained structure. The manner of superimposing and transmitting includes at least one of the following: non-orthogonal multiple access, MU-MIMO.

3), the self-contained structure specific to the business type

A self-contained structure specific to URLLC, which has at least one of the following characteristics:

It is composed of basic units with small time granularity, which can meet the requirements of low-latency traffic transmission. It has a higher priority. When it conflicts with resources of other service types, it is preferentially transmitted, so that low-latency transmission services can be transmitted in time. Different URLLC self-contained structures are configured in a continuous or small time interval in the time domain. This configuration can also meet the transmission requirements of low latency.

For the problem of conflicts with other types of resource structures, the UE may be notified of the resource configuration information of the URLLC self-contained structure in advance, so as to facilitate coordinated configuration. For example, the UE may blindly detect the presence or absence of the URLLC self-contained structure based on the preconfigured URLLC resource information of the included structure. If there is a URLLC self-contained structure signal, coordinated avoidance measures may be adopted.

A self-contained structure specific to mMTC, which has at least one of the following characteristics:

It consists of resources with large time granularity, which can meet the needs of wide coverage. It is composed of resources with small granularity in the frequency domain. The MMTC is generally a small service feature of the data block, and the frequency domain resource block is smaller and rated. The power spectral density that can be achieved is also higher; the structure can be configured to adopt a non-orthogonal multiple access mode, allowing multiple nodes to be superimposed and transmitted; the structure can be configured to adopt an unscheduled mechanism.

4) The self-contained structure of different scheduling attributes may include at least one of the following: a non-scheduled self-contained structure, the structure may be configured to perform a non-scheduled mechanism; the contention accesses a self-contained structure, and the structure may be configured to perform a competitive connection. Incoming mechanism; centralized scheduling self-contained structure, which can be configured by the base station to concentrate resource scheduling.

Further, at least one of the above self-contained structure types may be notified to other nodes by signaling, so that the node may use or coordinate the self-contained structure based on the signaling information; wherein the signaling may be dynamic signaling. And/or higher layer signaling. For example, high-level signaling pre-defined self-contained structure attributes, and nodes use self-contained structures according to predefined attributes, unless there is dynamic signaling to indicate changes; for example, the default pre-defined URLLC structure of the receiver of the URLLC node may transmit the URLLC service. The presence or absence of the URLLC traffic transmission is required. For example, the default pre-defined URLLC structure of the receiver of the eMBB node may transmit the URLLC service, and the presence or absence of the URLLC traffic transmission is required. If there is a URLLC service, the structure is based on the URLLC. The occupied resources are specially processed; if there is no URLLC service, the data of the resource mapping occupied by the URLLC structure is normally received.

Figure 2:
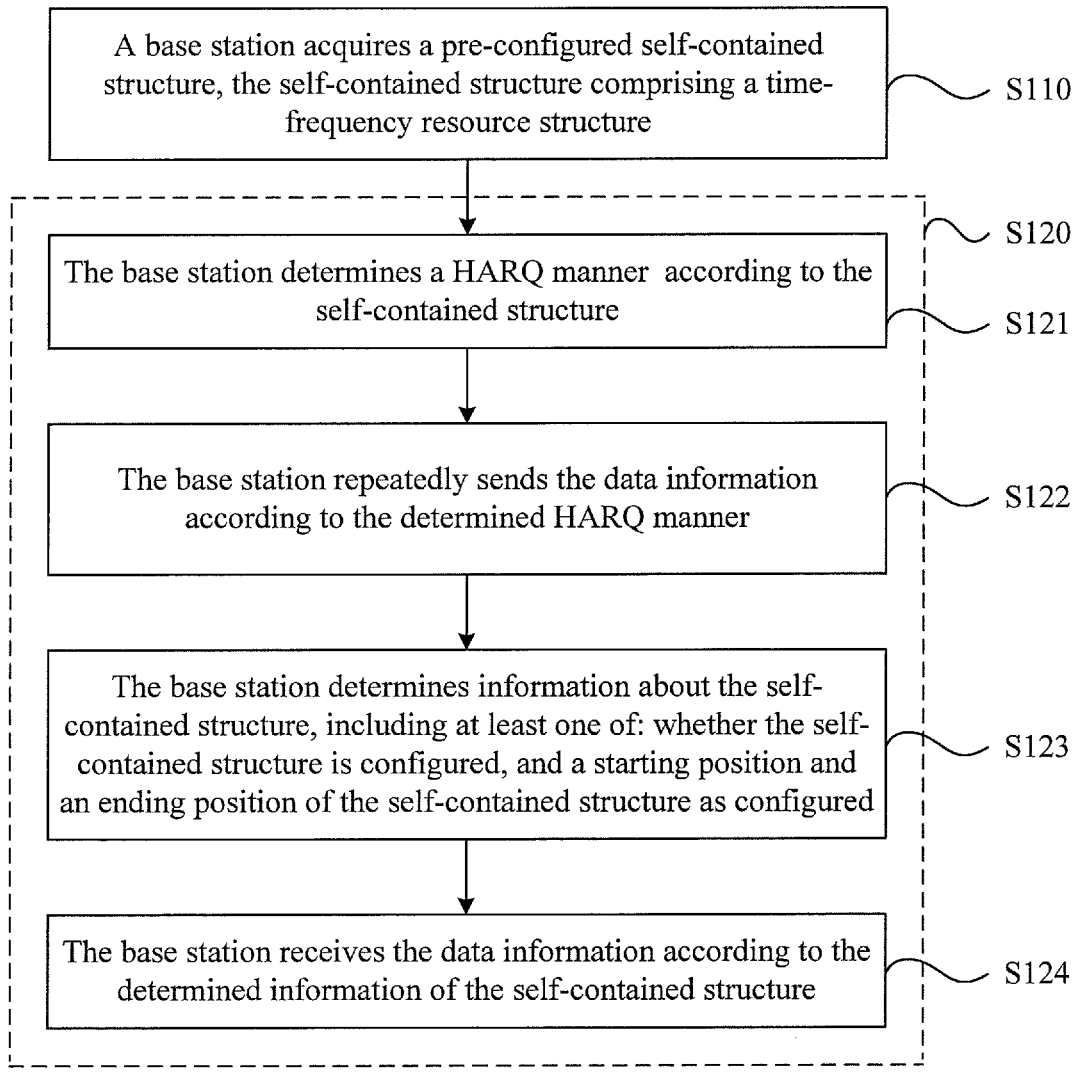
FIG. 2 is a flowchart illustrating another information transmission method according to an embodiment of the present disclosure.

Optionally, FIG. 2 is a flowchart of another information transmission method according to an embodiment of the present disclosure. On the basis of the embodiment shown in FIG. 1, the base station sends data information according to the self-contained structure in the embodiment, which may include:

S121. The base station determines a manner of HARQ according to the self-contained structure.

S122. The base station repeatedly sends the data information according to the determined HARQ manner.

In the embodiment of the present disclosure, the transmission power of the same signal or/and the same channel remains unchanged in a self-contained structure, and the different self-contained structures are the same or different; the determination of the transmission power may be through power control process.

The base station in this embodiment is a transmitting end of the downlink, and the sending behavior of the transmitting end when transmitting the downlink service may include at least one of the following: a HARQ process, a measurement and reporting process, and a power control process.

1), HARQ process, that is, the way of determining HARQ, the HARQ mode may include:

Mode 1, the data transmitted at the time and the HARQ-ACK/NACK corresponding to the data are configured in the same self-contained structure, and the different transmissions of the HARQ are in different self-contained structures, that is, the initial data and the initial HARQ-ACK/The NACK is configured in the same self-contained structure; the first retransmission data is configured in the same self-contained structure as the first retransmission HARQ-ACK/NACK; the second retransmission data and the second retransmission HARQ-ACK/NACK is configured in the same self-contained structure. This method is advantageous for scheduling different HARQ retransmissions on different carriers, and/or different nodes, and/or different beams, and/or different time-frequency resources with longer time intervals, which facilitates scheduling flexibility and facilitates better retransmission diversity gain.

Mode 2: The initial transmission and retransmission of all data in a HARQ process are configured in the same self-contained structure as the HARQ-ACK/NACK corresponding to the data. For example, if a HARQ is retransmitted three times in one TB, then all three are in the same self-contained structure. This structure is beneficial to reduce the overall delay of HARQ, and is mainly applicable to delay-sensitive service types.

Mode 3: The initial transmission and/or retransmission of part of the data in the primary HARQ process is configured in the same self-contained structure as the HARQ-ACK/NACK corresponding to the data. This structure facilitates a compromise between flexibility and complexity.

Mode 4: A part or all of the HARQ transmission process of a TB containing only one UE in a self-contained structure cannot contain multiple TB transmission processes.

Mode 5: A self-contained structure may include part or all of the HARQ transmission process of one or more TBs of one node (for example, a UE), but may not include a transmission procedure of TBs of multiple nodes (e.g., UEs). This structure facilitates the flexibility of node scheduling.

Mode 6. For data without HARQ-ACK/NACK feedback, a self-contained structure may include one or more repeated transmissions of the data by one TB, thereby improving reliability/cell coverage of the data.

Mode 7, a self-contained structure may include one or more repeated transmissions of data over multiple TBs. For example, an unlicensed carrier occupies 4 ms at a time, 0-2 ms transmits the first TB, and 3~4 ms transmits a second TB; for example, the PBCH repeats the transmission multiple times in a self-contained structure; for example, the discovery signal is in one Repeat the transfer multiple times in the self-contained structure.

2) Measurement and reporting process: CSI-RS triggering transmission and corresponding CSI measurement reporting are in the same self-contained structure; the CSI-RS triggering, i.e., CSI measurement reporting, may be UE-specific or node-specific (multiple UEs under the node)), or cell-specific (multiple UEs under the cell), specific to the cell set (multiple UEs under the cell set). The measurement reference signal may include at least one of the following: CSI-RS, CRS, DRS, UL-DRS, SRS, PRS, beam reference signal. The measurement reporting object may include at least one of the following: CSI, PMI, CQI, RSSI, CCA success or failure information, RSRP, cell information, synchronization information, beam information, carrier information.

For example, the triggering of the aperiodic CSI-RS is sent in a self-contained structure, and the trigger information is notified to the UE, and the UE measures the CSI according to the aperiodic CSI-RS, and is in the same self-containment as the aperiodic CSI-RS. The feedback message is sent to the base station within the structure.

As another example, the cell/beam-specific signals are configured to be transmitted simultaneously or in a time-sharing in different beams of a beam set within a predefined time window. The structure is beneficial for the UE to complete the detection and reception of the beam set-specific signal in the time window. The cell/beam-specific signal may include at least one of the following: DRS, beam identification signal, beam-specific reference signal, broadcast signal, cell reference signal.

3) Power control process, the structure of the power control may be: the same signal or/and the transmission power of the same channel remain unchanged in a self-contained structure, and the different self-contained structures are the same or different.

For common signals and/or channels such as DRS, PBCH, etc., the power values can be assumed to be constant between different self-contained structures unless there is control information to change the configuration. For DRS, maintaining constant power of different self-contained structures can ensure the accuracy of RRM measurement; for PBCH to maintain constant power between different structures, the coverage area of the cell can be stabilized.

Further, the receiving, by the base station, the data information according to the self-contained structure in the embodiment may include:

S123. The base station determines information about the self-contained structure, where the determined information includes at least one of the following: whether the self-contained structure is configured, and a starting position and an ending position of the configured self-contained structure;

S124. The base station receives the data information according to the determined information of the self-contained structure.

In this embodiment, the base station may obtain the component of the self-contained structure in advance, that is, whether the base station side is configured to have a self-contained structure, and the start position and/or the end position of the configured self-contained structure; therefore, the base station may Corresponding operations are performed according to the acquired self-contained structure, including, for example, receiving data information and transmitting data information as described above.

Figure 3:
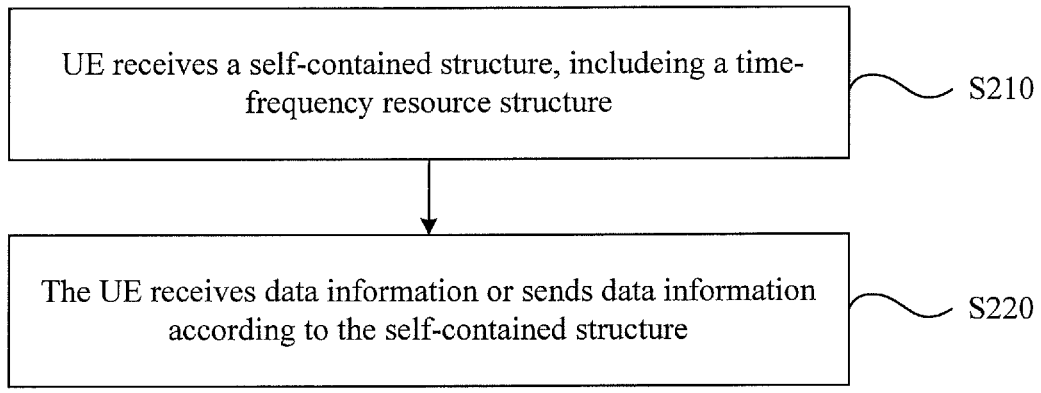
FIG. 3 is a flowchart illustrating still another method for transmitting information according to an embodiment of the present disclosure.

FIG. 3 is a flowchart of still another method for transmitting information according to an embodiment of the present disclosure. The information transmission method provided in this embodiment may be implemented by an information transmission device, which is implemented by a combination of hardware and software, and the apparatus may be integrated in a processor of the UE for use by the processor. As shown in FIG. 3, the method in this embodiment may include:

S210. The UE receives a self-contained structure, where the self-contained structure includes a time-frequency resource structure.

The information transmission method provided by the embodiment of the present disclosure is a method for transmitting information by using a self-contained structure. The manner in which the UE acquires the self-contained structure may be a notification message or a control message sent by the receiving base station, where the notification message or the control message is carried. There is a self-contained structure, or it can be obtained by the UE through blind detection. In the embodiment, the self-contained structure includes components for performing information transmission, and the components included therein may also reflect the process of information transmission. The structure of the time-frequency resource in this embodiment may also include at least one of the foregoing structure 1 to structure 5, and details are not described herein again.

S220. The UE receives data information or sends data information according to the self-contained structure.

In this embodiment, the role of the self-contained structure learned by the UE through the notification message is to realize information transmission. According to the content of the time-frequency resource structure in the self-contained structure, it can be seen that in order to perform transmission of different types of information, the time-frequency can be The different components of the resource structure design, that is, the above structure 1 to structure 5 can be applied to the transmission of different service types and different requirements, and after acquiring the self-contained structure, the UE can perform the corresponding transmission manner according to the components of the acquired self-contained structure, including receiving data information or sending data information.

Compared with the self-contained subframe structure in the existing LTE technology, the time-frequency resource structure of the self-contained structure in this embodiment includes a time domain resource structure and a frequency domain resource structure, and the time domain resource structure may include one or A plurality of basic units, for example, including one or more subframes, transmission time intervals TTI or OFDM symbols, etc., the frequency domain resources may include one or more frequency domain RBs, subcarriers or component carriers, and the like. Apparently, the structure design of the self-contained structure in the embodiment of the present disclosure is more flexible, and is not limited to one sub-frame in the time domain. Therefore, the data traffic transmission duration in various application scenarios can be met. Higher adaptability.

The information transmission method provided in this embodiment causes the UE to acquire a self-contained structure for transmitting service data by using a notification message, and receives data information or transmits data information according to the self-contained structure, wherein the self-contained structure includes one or more The structure of the time-frequency resource structure; compared with the self-contained subframe structure in the prior art, the present embodiment solves the prior art due to the self-contained subframe structure by designing a highly flexible self-contained structure. The limitation is large, and the problem of poor adaptability of the transmission mode is achieved, thereby realizing the requirement of the data traffic transmission in a plurality of application scenarios and having high adaptability.

Figure 4:
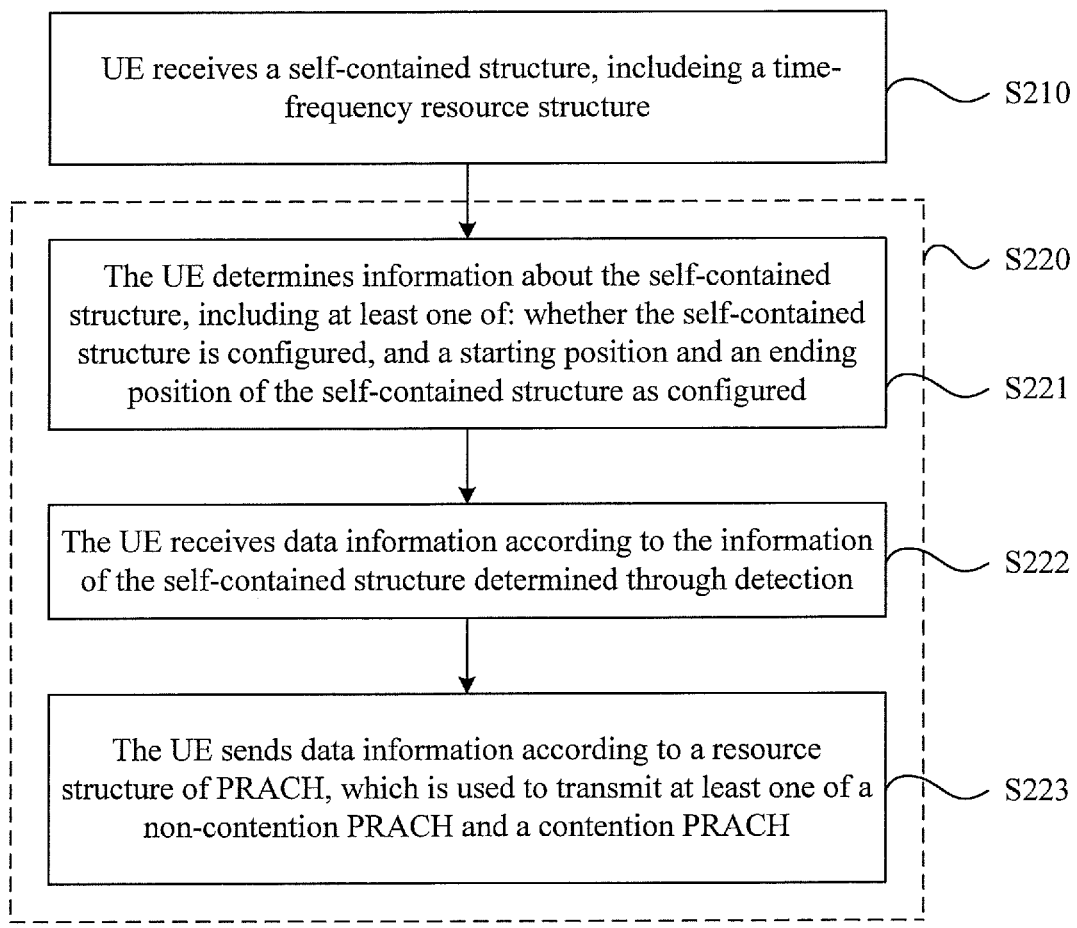
FIG. 4 is a flowchart illustrating still another method for transmitting information according to an embodiment of the present disclosure.

Optionally, FIG. 4 is a flowchart of still another method for transmitting information according to an embodiment of the present disclosure. On the basis of the embodiment shown in FIG. 3, in this embodiment, the UE may receive data information according to the self-contained structure, and may include:

S221: The UE determines the information of the self-contained structure, where the determined information includes at least one of the following: whether the self-contained structure is configured, a starting position and an ending position of the configured self-contained structure;

S222. The UE receives the data information according to the information of the self-contained structure determined by the check.

The UE in this embodiment detects the information of the self-contained structure, and may adopt at least one of the following manners:

Mode 1, blind-detecting whether the self-contained structure is configured, and the configured self-contained structure starting position;

Mode 2, detecting, according to the notification message, whether a self-contained structure is configured, and a configured self-contained structure starting position;

Mode 3: detecting, according to the control signaling, whether a self-contained structure is configured, and a configured self-contained structure starting position;

Mode 4, based on blind access, whether to configure a self-contained structure, and a configured self-contained structure end position;

Mode 5: Based on the control signaling, whether the self-contained structure is configured, and the configured self-contained structure end position are obtained.

It should be noted that, in this embodiment, the manner of obtaining the uplink and downlink attributes of the resource may be at least one of the following:

Mode 1, the UE assumes that all resources are downlink resources, unless there is signaling indicating that a resource is an uplink resource;

Mode 2: The UE assumes that all resources are uplink resources, unless there is signaling indicating that a resource is a downlink resource.

Mode 3: The uplink and downlink attributes of the pre-defined resource, the transceiver end receives and sends data based on the predefined attributes, unless there is signaling to change the uplink and downlink attributes;

Mode 4: The resource attribute does not make special assumptions, and the transmitting and receiving end decides to use the attribute autonomously, unless the attribute is changed by signaling;

Mode 5: The resource attribute does not make special assumptions, and the use attribute is determined by the transceiver before use, unless there is other signaling special configuration;

Mode 6, the resource attribute does not make special assumptions, and the sender decides to use the attribute unless there is other signaling special configuration.

Further, in the embodiment, the UE sends the data information according to the self-contained structure, which may include:

S223. The UE sends data information according to a resource structure of the PRACH, where the resource structure of the PRACH is used to transmit at least one of a non-contention PRACH and a contention PRACH.

In the embodiment of the present disclosure, the transmission power of the same signal or/and the same channel remains unchanged in a self-contained structure, and the different self-contained structures are the same or different; the determination of the transmission power may be through power. The control process is implemented.

For the manner in which the UE sends the uplink service data, a random access procedure is involved. In the process, for the non-contention PRACH, the PRACH trigger signaling, the PRACH transmission, and the PRACH response information transmission are in the same self-contained structure. For the contention of the PRACH, at least one of the following methods may be adopted: the entire process of the entire transmission and response of the PRACH is in the same self-contained structure; the transmission and response of the PRACH are respectively in different self-contained structures; the initial transmission of the PRACH is in An independent self-contained structure, the other process is in another self-contained structure; the first and second steps of PRACH are in one self-contained structure, and the other processes are in another self-contained structure.

It should be noted that, in the embodiment of the present disclosure, the components of the self-contained structure, the specific content of each component, the specific structure of the time-frequency resource structure, and the configuration manner, type, attribute, and time-frequency resource of the self-contained structure are all related to The above embodiments are the same, and therefore will not be described again.

Another information transmission method provided by the embodiment of the present disclosure is used to solve the problem of mixed transmission of different channel types, and may specifically include at least one of the following situations: eMBB and URLLC, eMBB and mMTC, URLLC and ULRLLC, URLLC Different combinations of control channels and traffic channels, such as mMTC, mMTC and mMTC.

For example, UE1 and UE2 transmit eMBB, and UE3 and UE4 transmit URLLC. The basic principle is that URLLC services have a higher priority than eMBB.

Scenario 1: UE1 is transmitting the downlink eMBB service, and the service packet of the downlink URLLC of UE3 arrives. Due to the high reliability and latency requirements of URLLC services, there is a higher priority. For this case, one or more transmissions can be further adopted as follows:

Mode 1-1: The URLLC of the UE3 is scheduled to be transmitted immediately, so that the delay requirement of the URLLC service of the UE3 can be better ensured.

The eMBB service of UE1 may adopt one or more transmissions in the following manner:

Stopping the transmission directly, the processing method is simple, but it has an impact on the performance of the eMBB service, and it also brings waste of resources to the transmitted part. The base station may use dynamic signaling to indicate that the UE1 stops transmitting the information and/or the URLLC occurrence information of the eMBB service, and the UE1 may detect and receive the dynamic indication information. To simplify the dynamic indication of the base station and the receiving detection of the UE, some candidate time domain and/or frequency domain location may be further configured in the middle of the eMBB resource, and only the locations may be configured to transmit the dynamic indication information. For example, some sub-resource units are optionally divided according to the time domain and/or resource granularity of the URLLC, and the resource locations are configured to transmit the dynamic indication information. Another possible processing method of the base station is that, without dynamic indication, the UE1 blindly displays the information of the eMBB service to stop transmission and/or the URLLC occurrence information. For simplification, some candidate time domain and/or frequency domain locations may be further configured in the middle of the eMBB resource, and only these locations will configure the transport URLLC. For example, some sub-resource units are optionally partitioned according to the time domain and/or resource granularity of the URLLC, and these resource locations are configured to transmit the URLLC service.

Optionally, the eMBB service of UE1 may only cancel the traffic transmission overlapping with the URLLC channel resource. This method is simple, but it has an impact on the performance of the eMBB service, and it also brings waste of resources to the transmitted part. The base station may use dynamic signaling to indicate that the UE1 has its eMBB service punctured information and/or URLLC occurrence information, and the UE1 may detect and receive the dynamic indication information. To simplify the dynamic indication of the base station and the receiving detection of the UE, some candidate time domain and/or frequency domain location may be further configured in the middle of the eMBB resource, and only the locations may be configured to transmit the dynamic indication information. For example, some sub-resource units are optionally divided according to the time domain and/or resource granularity of the URLLC, and the resource locations are configured to transmit the dynamic indication information. Another possible processing method of the base station is that, without dynamic indication, the UE1 blindly displays the information of the eMBB service to stop transmission and/or the URLLC occurrence information. For simplification, some candidate time domain and/or frequency domain locations may be further configured in the middle of the eMBB resource, and only these locations are configured to transmit the URLLC. For example, some sub-resource units are optionally partitioned according to the time domain and/or resource granularity of the URLLC, and these resource locations are configured to transmit the URLLC. The processing manner in which the eMBB is partially deleted may further include at least one of the following: (a) directly dropping; (b) retransmitting at a new time-frequency resource location, where the new resource location may be in the default location, or a predefined location, or a location indicated by dynamic signaling.

Optionally, the transmission of the UE's eMBB service may remain unchanged or the transmission power of the portion overlapping with the URLLC channel resource may be reduced. This way of handling reduces the impact on eMBB traffic. The base station may use dynamic signaling to indicate that the UE1 has its eMBB service power reduction information and/or URLLC occurrence information, and the UE1 may detect and receive the dynamic indication information. To simplify the dynamic indication of the base station and the receiving detection of the UE, some candidate time domain and/or frequency domain location may be further configured in the middle of the eMBB resource, and only the locations may be configured to transmit the dynamic indication information. Another possible processing method of the base station is that without dynamic indication, the UE1 blindly displays its eMBB service power reduction information and/or URLLC appearance information. For simplification, some candidate time domain and/or frequency domain locations may be further configured in the middle of the eMBB resource, and only these locations are configured to transmit the dynamic indication information. For example, some sub-resource units are optionally partitioned according to the time domain and/or resource granularity of the URLLC, and these resource locations are configured to transmit the URLLC service. For example, some sub-resource units are optionally divided according to the time domain and/or resource granularity of the URLLC, and the resource locations are configured to transmit the dynamic indication information.

Optionally, the overlapping portion of the eMBB service and the URLLC channel resource of UE1 is in the time domain and/or an offset is added, and the overlapping relationship with the URLCC resource is staggered. This way of handling reduces the impact on eMBB traffic. The base station may use dynamic signaling to indicate that the UE1 has the resource offset information and/or the URLLC occurrence information of its eMBB service, and the UE1 may detect and receive the dynamic indication information. To simplify the dynamic indication of the base station and the receiving detection of the UE, some candidate time domain and/or frequency domain location may be further configured in the middle of the eMBB resource, and only the locations may be configured to transmit the dynamic indication information. Another possible processing method of the base station is that, without dynamic indication, UE1 blindly displays the resource offset information and/or URLLC occurrence information of its eMBB service. For simplification, some candidate time domain and/or frequency domain locations may be further configured in the middle of the eMBB resource, and only these locations are configured to transmit the dynamic indication information. For example, some sub-resource units are optionally partitioned according to the time domain and/or resource granularity of the URLLC, and these resource locations are configured to transmit the URLLC service. For example, some sub-resource units are optionally divided according to the time domain and/or resource granularity of the URLLC, and the resource locations are configured to transmit the dynamic indication information.

Mode 1-2: Waiting for the current UE1 to complete the eMBB transmission, and then scheduling the transmission of the URLLC of the UE3, so that the performance of the eMBB service of the UE1 can be better ensured. The typical usage scenario is as follows: When the URLLC service of the UE3 arrives, the eMBB service of the UE1 is about to complete the transmission, and even if the eMBB service of the U1 is transmitted, the URLLC of the UE3 is not scheduled to be transmitted, and the delay of the URLLC of the UE3 is not seriously affected.

Scenario 2: The UE1 is transmitting the downlink eMBB service, and the service packet of the uplink URLLC of the UE3 arrives. Due to the high reliability and latency requirements of URLLC services, there is a higher priority. For this case, one or more transmissions can be further adopted as follows:

Mode 2-1: The URLLC of the UE3 is scheduled to be transmitted immediately, so that the delay requirement of the URLLC service of the UE3 can be better ensured.

The eMBB service of UE1 may adopt one or more transmissions of the following methods:

The transmission is stopped directly, and the frequency resource of the base station is switched from downlink transmission to uplink reception. This method is simple, but it has an impact on the performance of the eMBB service, and it also brings waste of resources to the transmitted part.

Optionally, the eMBB service of UE1 may only cancel the traffic transmission overlapping with the URLLC channel resource. The frequency resource of the base station is switched from downlink transmission to uplink reception. This method is simple, but it has an impact on the performance of the eMBB service, and it also brings waste of resources to the transmitted part.

Optionally, the downlink eMBB service of UE1 may remain unchanged or the transmission power of the overlap with the URLLC channel resource may be reduced. At this time, the downlink eMBB service of UE1 and the uplink URLLC service of UE3 are transmitted on the same frequency band;

Optionally, the overlapping portion of the eMBB service and the URLLC channel resource of UE1 is in the time domain and/or an offset is added, and the overlapping relationship with the URLCC resource is staggered. This way of handling reduces the impact on eMBB traffic.

For the uplink URLLC service to obtain information, or the base station obtains information from other cells or logical entities, or the local cell can detect the information that the uplink URLLC reaches and/or transmits. In order to simplify the detection of the base station, some candidate time domain and/or frequency domain location may be further configured in the middle of the eMBB resource, and only these locations are configured to transmit the URLLC, and the base station may detect the occurrence of the uplink URLLC only at these locations. For example, some sub-resource units are optionally partitioned according to the time domain and/or resource granularity of the URLLC, and these resource locations are configured to transmit the URLLC. The base station may use dynamic signaling to indicate that the UE1 stops transmitting the information and/or the URLLC occurrence information of the eMBB service, and the UE1 may detect and receive the dynamic indication information. To simplify the dynamic indication of the base station and the receiving detection of the UE, some candidate time domain and/or frequency domain location may be further configured in the middle of the eMBB resource, and only the locations may be configured to transmit the dynamic indication information. For example, some sub-resource units are optionally divided according to the time domain and/or resource granularity of the URLLC, and the resource locations are configured to transmit the dynamic indication information. Another possible processing method of the base station is that, without dynamic indication, the UE1 blindly displays the information of the eMBB service to stop transmission and/or the URLLC occurrence information. For simplification, some candidate time domain and/or frequency domain locations may be further configured in the middle of the eMBB resource, and only these locations will configure the transport URLLC. For example, some sub-resource units are optionally partitioned according to the time domain and/or resource granularity of the URLLC, and these resource locations are configured to transmit the URLLC service.

Mode 2-2: Waiting for the current UE1 to complete the eMBB transmission, and then scheduling the transmission of the URLLC of the UE3, so that the performance of the eMBB service of the UE1 can be better ensured. For the UE3, the base station displays the signaling scheduling indication; or the UE3 performs measurement sensing before transmitting the URLLC. If the cell is found to be transmitting the downlink eMBB service, the UE3 selects to wait for the eMBB transmission to complete before scheduling the transmission. The typical usage scenario is as follows: When the URLLC service of the UE3 arrives, the eMBB service of the UE1 is about to complete the transmission, and even if the eMBB service of the U1 is transmitted, the URLLC of the UE3 is not scheduled to be transmitted, and the delay of the URLLC of the UE3 is not seriously affected.

Mode 2-3: The current UE1 eMBB transmission is not changed. For the UE3, the base station displays the signaling scheduling indication; or the UE3 performs measurement sensing before transmitting the URLLC. If it is found that a resource of the cell is transmitting the downlink eMBB service, the UE3 selects the frequency resource scheduling transmission other than the eMBB. For example, in other frequency subbands of the cell band, or in other candidate cells.

Scenario 3: UE1 is transmitting the uplink eMBB service, and the service packet of the uplink URLLC of UE3 arrives. Due to the high reliability and latency requirements of URLLC services, there is a higher priority. For this case, one or more transmissions can be further adopted as follows:

Mode 3-1: The URLLC of the UE3 is scheduled to be transmitted immediately, so that the delay requirement of the URLLC service of the UE3 can be better ensured.

The eMBB service of UE1 may adopt one or more transmissions of the following methods:

Stopping the transmission directly, the processing method is simple, but it has an impact on the performance of the eMBB service, and it also brings waste of resources to the transmitted part.

Optionally, the eMBB service of UE1 may only cancel the traffic transmission overlapping with the URLLC channel resource. The frequency resource of the base station is switched from downlink transmission to uplink reception. This method is simple, but it has an impact on the performance of the eMBB service, and it also brings waste of resources to the transmitted part.

Optionally, the downlink eMBB service of UE1 may remain unchanged or the transmission power of the overlap with the URLLC channel resource may be reduced. At this time, the downlink eMBB service of UE1 and the uplink URLLC service of UE3 are transmitted on the same frequency band;

Optionally, the overlapping portion of the eMBB service and the URLLC channel resource of UE1 is in the time domain and/or an offset is added, and the overlapping relationship with the URLCC resource is staggered. This way of handling reduces the impact on eMBB traffic.

The UE1 obtains the information of the UE3 uplink URLLC service, and adopts at least one of the following modes: (a) the base station detects the arrival of the URLLC service of the UE3, and dynamically indicates the UE1. The UE1 receives the indication information by using its other carrier in the process of transmitting the eMBB; or the UE1 receives the indication information on the carrier in a full-duplex manner; or the UE1 is configured with a slot interval in the middle of its eMBB transmission, and the UE1 may Receiving the indication information sent by the base station at these time slot intervals; (b) UE1 autonomously detecting the occurrence of the URLLC of the UE3. UE1 uses its other carrier to receive the presence of the sensed URL of UE3 in its transmission of eMBB; or UE1 receives the presence of the sensed URL of UE3 on the carrier in full-duplex mode; or UE1 has a time slot configured in the middle of its eMBB transmission At intervals, UE1 may receive the presence of the URLLC of UE3 at these slot intervals. In order to simplify the detection, some candidate time domain and/or frequency domain location may be further configured in the middle of the eMBB resource, and only these locations are configured to transmit the URLLC, and the base station may detect the occurrence of the UE3 uplink URLLC only at these locations. For example, some sub-resource units are optionally partitioned according to the time domain and/or resource granularity of the URLLC, and these resource locations are configured to transmit the URLLC. The base station may use dynamic signaling to indicate the modulation information and/or URLLC occurrence information of the UE1's eMBB traffic transmission, and the UE1 may detect and receive the dynamic indication information. To simplify the dynamic indication of the base station and the receiving detection of the UE, some candidate time domain and/or frequency domain location may be further configured in the middle of the eMBB resource, and only the locations may be configured to transmit the dynamic indication information. For example, some sub-resource units are optionally divided according to the time domain and/or resource granularity of the URLLC, and the resource locations are configured to transmit the dynamic indication information. Another possible processing method of the base station is that, without dynamic indication, UE1 blindly modulates the modulation information and/or URLLC occurrence information of its eMBB traffic transmission. For simplification, some candidate time domain and/or frequency domain locations may be further configured in the middle of the eMBB resource, and only these locations will configure the transport URLLC. For example, some sub-resource units are optionally partitioned according to the time domain and/or resource granularity of the URLLC, and these resource locations are configured to transmit the URLLC service.

Mode 3-2: Waiting for the current UE1 to complete the eMBB transmission, and then scheduling the transmission of the URLLC of the UE3, so that the performance of the eMBB service of the UE1 can be better ensured. For the UE3, the base station displays the signaling scheduling indication; or the UE3 performs measurement sensing before transmitting the URLLC. If the cell is found to be transmitting the downlink eMBB service, the UE3 selects to wait for the eMBB transmission to complete before scheduling the transmission. The typical usage scenario is as follows: When the URLLC service of the UE3 arrives, the eMBB service of the UE1 is about to complete the transmission, and even if the eMBB service of the U1 is transmitted, the URLLC of the UE3 is not scheduled to be transmitted, and the delay of the URLLC of the UE3 is not seriously affected.

Mode 3-3: The current UE1 eMBB transmission is not changed. For the UE3, the base station displays the signaling scheduling indication; or the UE3 performs measurement sensing before transmitting the URLLC. If it is found that a resource of the cell is transmitting the downlink eMBB service, the UE3 selects the frequency resource scheduling transmission other than the eMBB. For example, in other frequency subbands of the cell band, or in other candidate cells.

Further, the base station may broadcast the URLLC scheduling information by using the common control information, so that the UEs of multiple eMBBs are simultaneously detected, thereby reducing signaling overhead.

Further, the UE 3 transmitting the uplink URLCC may broadcast information of its scheduled transmission URLLC, for example, transmitting preamble information, which is convenient for other UEs to detect.

Further, mix transmission may be occurred when different UEs in adjacent cells transmit the eMBB and the URLCC service separately. Transmission may be communication and coordinated between cells can be coordinated and transmitted through the air interface or the backhaul interface. For example, the interactive URLLC transmits information, for example, the time-frequency resource information to be occupied, so that the transmission requirements of the high-priority URLCC are considered in other cell scheduling. Or coordinating the reservation of the URLLC resource, for example, notifying the cell to reserve the transmission resource of the uplink and/or downlink URLLC. If the measurement sensing mechanism is adopted, at least one of the following may be coordinated: sensing the time-frequency resource pattern, sensing the signal configuration information, and sensing the threshold information of the measurement.

Further, when more UEs transmit the same or different services, the above measurement sensing or base station scheduling indication may also be adopted.

The typical application scenario is as follows: a UE that sends an uplink eMBB configures a time interval in the middle of its eMBB transmission to detect the adjustment information, and the adjustment indication adopts a secondary (or multi-level) control; or, the base station is transmitting a downlink eMBB in its eMBB. The intermediate configuration time interval is transmitted to detect the adjustment or coordination information.

For mixed transmission of different services or mixed transmission between different UEs of the same type of service, the indication information of mMTC or URLLC transmission may be sent in advance in consideration of the processing delay problem. Here is an example of URLLC.

The indication information transmitted by the URLLC can be sent in advance. For example, if the URLLC service is sent at time t1, the identifier information sent by the URLLC may be sent at time t0, and t0 is before time t1. For example, t0 advance t1 may be one or more OFDM symbols, one or more time slots, one or more subframes. Typically, one or more OFDM symbols are advanced, for example 2 OFDM symbols in advance, i.e., an OFDM symbol may be sandwiched between t0 and t1 so that the receiver can have a processing time of one OFDM symbol.

The identifier information of the URLLC may include at least one of the following information: (a) indicating whether the URLLC service is present; (b) a time-frequency resource to be used by the URLLC service; and (c) encoding and modulation. At least one of the code block size, and the like. Other base stations and/or UEs may adjust their coordination relationship with the URLLC service based on at least one of the above information, such as adjusting their scheduling decisions, or performing interference cancellation, and the like. For example, for the eMBB service, if the indication information of the URLLC service is detected, operations such as puncturing, power adjustment, and the like may be performed at the time-frequency resource location where the URLLC occurs; if the URLLC service is not detected, the eMBB service is transmitted normally. Or identifying the UE and/or the cell that sends the URLLC by detecting the identifier information of the URLLC, so that the coordination is more targeted; or measuring the identifier information of the URLLC, obtaining the interference information, and determining the scheduling mode adopted by the user (for example, obtaining CQI information) and so on.

The transmission manner of the identifier information may be: the reserved dedicated resource is used to transmit the identifier information, and the reserved resource is not used for transmission of other signals and/or channels, thereby ensuring performance of the indication information detection. For example, it may be configured to appear at a time interval, and the frequency domain may be some resource elements occupying sparseness, or a preamble sequence, or a predefined reference signal.

For example, the identifier information of the downlink URL LC service may be configured to detect that the UE or the multiple UEs in the cell can detect and receive the identifier information for coordination between one or more UEs in the cell, or configure the neighbor cell base station and/or Or the UE receives the identification information for coordination between one or more UEs between cells. The identifier information of the uplink URLLC service may be configured to enable the UE to detect and receive the identifier information for the coordination between one or more UEs in the cell, or configure the intra-cell base station to detect Receiving the identifier information, for the base station to uniformly coordinate multiple UEs in the cell; or configuring the intra-cell base station and the UE to detect and receive the identifier information, and the base station and the UE cooperate to coordinate multiple UEs in the cell; or configure The neighboring cell base station and/or the UE receives the identification information, and is used for coordination between one or more UEs between cells.

Further, the base station may use the identifier information of the detected URLLC service to indicate that the scheduled traffic transmission is adjusted (for example, the base station sends secondary or multi-level scheduling indication information), for example, stop sending, power adjustment, and adjusting the time frequency of the transmission. Resources, etc. The UE may use the identifier information of the detected URLLC service to determine its own traffic transmission adjustment, such as stopping transmission, adjusting the transmitted time-frequency resource, adjusting the transmission power, and the like. A typical scenario in which the UE autonomously adjusts is an uplink grant-free scenario.

A typical application scenario of the identifier information detection of the URLLC service is: the UE transmitting the uplink eMBB configures a time interval in the middle of its eMBB transmission to detect the identifier information; or, the base station is transmitting the downlink eMBB, and configures a time interval in the middle of its eMBB transmission. Detecting the identification information.

Figure 5:
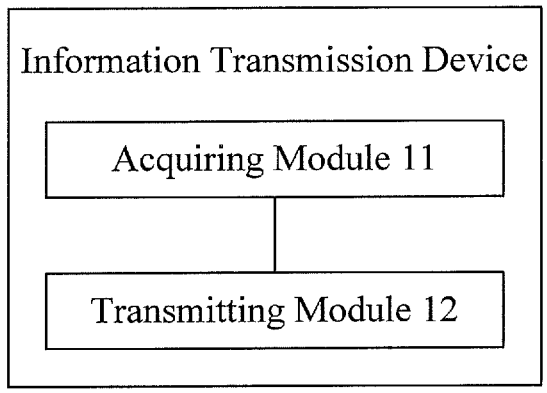
FIG. 5 is a block diagram illustrating an information transmission device according to an embodiment of the present disclosure.

FIG. 5 is a schematic block diagram of an information transmission device according to an embodiment of the present disclosure. The information transmission device provided in this embodiment is implemented by a combination of hardware and software, and the apparatus may be integrated in a processor of the base station for use by the processor. As shown in FIG. 5, the information transmission device of this embodiment may include: an acquiring module 11 and a transmitting module 12.

The acquiring module 11 is configured to obtain a self-contained structure of the configuration, where the self-contained structure includes a time-frequency resource structure.

The information transmission device provided by the embodiment of the present disclosure is a device for transmitting information by using a self-contained structure. The self-contained structure may be pre-configured. For example, the management network element in the network may be configured for the base station, or may be the base station is dynamically configured. In the embodiment, the self-contained structure includes components for performing information transmission, and the components included therein may also reflect the process of information transmission. The structure of the time-frequency resource in this embodiment may also include at least one of the foregoing structure 1 to structure 5, and details are not described herein again.

The transmitting module 12 is configured to send data information or receive data information according to the self-contained structure acquired by the acquiring module 11.

In this embodiment, the role of the pre-configured self-contained structure is to realize information transmission. According to the content of the time-frequency resource structure in the self-contained structure, it can be seen that in order to perform transmission of different types of information, the time-frequency resource structure can be designed. The different components, that is, the above structure 1 to structure 5 can be applied to the transmission of different service types and different requirements. After obtaining the self-contained structure, the base station can perform corresponding transmission modes according to the acquired components of the self-contained structure, including sending. Data information or receiving data information.

The information transmission device provided by the embodiment of the present disclosure is used to perform the information transmission method provided by the embodiment shown in FIG. 1 of the present disclosure, and has a corresponding function module, and the implementation principle and technical effects thereof are similar, and details are not described herein again.

It should be noted that, in the embodiment of the present disclosure, the components of the self-contained structure, the specific content of each component, the specific structure of the time-frequency resource structure, and the configuration manner, type, attribute, and time-frequency resource of the self-contained structure are all related to The above embodiments are the same, and therefore will not be described again.

Figure 6:
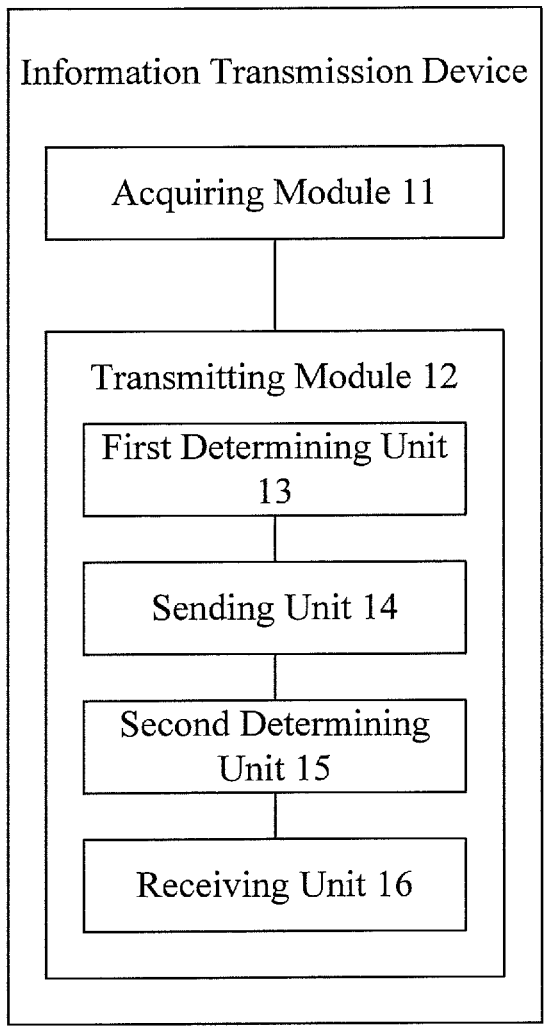
FIG. 6 is a block diagram illustrating another information transmission device according to an embodiment of the present disclosure.

Optionally, FIG. 6 is a schematic block diagram of another information transmission device according to an embodiment of the present disclosure. On the basis of the structure of the apparatus shown in FIG. 5, the transmitting module 12 in this embodiment may include:

The first determining unit 13 is configured to determine a manner of the hybrid automatic repeat request HARQ according to the self-contained structure acquired by the acquiring module 11;

The transmitting unit 14 is configured to repeatedly transmit the data information according to the manner of determining the HARQ determined by the first determining unit 13.

In the embodiment of the present disclosure, the transmission power of the same signal or/and the same channel remains unchanged in a self-contained structure, and the different self-contained structures are the same or different.

Further, the transmitting module 12 in this embodiment may further include:

The second determining unit 15 is configured to determine information about the self-contained structure, where the determined information includes at least one of the following: whether the self-contained structure is configured, a starting position and an ending position of the configured self-contained structure;

The receiving unit 16 is configured to receive the data information according to the information of the self-contained structure determined by the second determining unit 15.

It should be noted that, the specific process for the base station to send the data information and the manner of receiving the data information in the embodiment of the present disclosure have been described in the foregoing embodiments, and therefore are not described herein again.

The information transmission device provided by the embodiment of the present disclosure is used to perform the information transmission method provided by the embodiment shown in FIG. 2 of the present disclosure, and has a corresponding function module, and the implementation principle and the technical effect thereof are similar, and details are not described herein again.

In a specific implementation, the sending unit 14 and the receiving unit 16 in the transmitting module 12 in the embodiments shown in FIG. 5 and FIG. 6 can be implemented by using a transceiver of the base station, and the acquiring module 11 and the transmitting module 12 are configured. A determining unit 13 and a second determining unit 15 may be implemented by a processor of a base station, which may be, for example, a central processing unit (CPU), or an application specific integrated circuit (Application Specific Integrated Circuit), abbreviated as: ASIC), or one or more integrated circuits that implement embodiments of the present disclosure.

Figure 7:
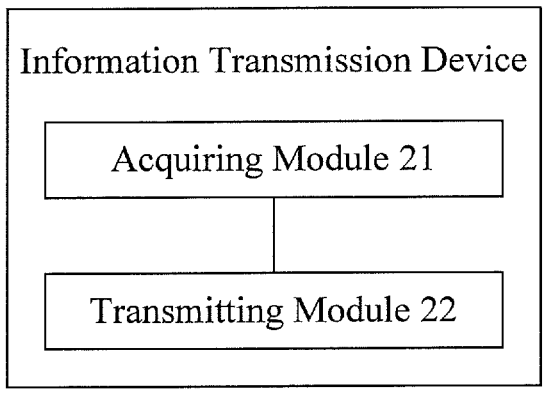
FIG. 7 is a block diagram illustrating still another information transmission device according to an embodiment of the present disclosure.

FIG. 7 is a schematic block diagram of still another information transmission device according to an embodiment of the present disclosure. The information transmission device provided in this embodiment is implemented by a combination of hardware and software, and the apparatus may be integrated in a processor of the UE for use by the processor. As shown in FIG. 7, the information transmission device of this embodiment may include: an acquiring module 21 and a transmitting module 22.

The acquiring module 21 is configured to obtain a self-contained structure, where the self-contained structure includes a time-frequency resource structure.

The information transmission device provided by the embodiment of the present disclosure is a device for transmitting information by using a self-contained structure. The manner in which the UE acquires the self-contained structure may be a notification message or a control message sent by the receiving base station, where the notification message or the control message is carried. There is a self-contained structure, or it can be obtained by the UE through blind detection. In the embodiment, the self-contained structure includes components for performing information transmission, and the components included therein may also reflect the process of information transmission. The structure of the time-frequency resource in this embodiment may also include at least one of the foregoing structure 1 to structure 5, and details are not described herein again.

The transmitting module 22 is configured to receive data information or send data information according to the self-contained structure received by the acquiring module 21.

In this embodiment, the role of the self-contained structure learned by the UE through the notification message is to realize information transmission. According to the content of the time-frequency resource structure in the self-contained structure, it can be seen that in order to perform transmission of different types of information, the time-frequency can be The different components of the resource structure design, that is, the above structure 1 to structure 5 can be applied to the transmission of different service types and different requirements, and after acquiring the self-contained structure, the UE can perform the corresponding transmission manner according to the components of the acquired self-contained structure, including receiving data information or sending data information.

The information transmission device provided by the embodiment of the present disclosure is used to perform the information transmission method provided by the embodiment shown in FIG. 3 of the present disclosure, and has a corresponding function module, and the implementation principle and the technical effect are similar, and details are not described herein again.

It should be noted that, in the embodiment of the present disclosure, the components of the self-contained structure, the specific content of each component, the specific structure of the time-frequency resource structure, and the configuration manner, type, attribute, and time-frequency resource of the self-contained structure are all related to The above embodiments are the same, and therefore will not be described again.

Figure 8:
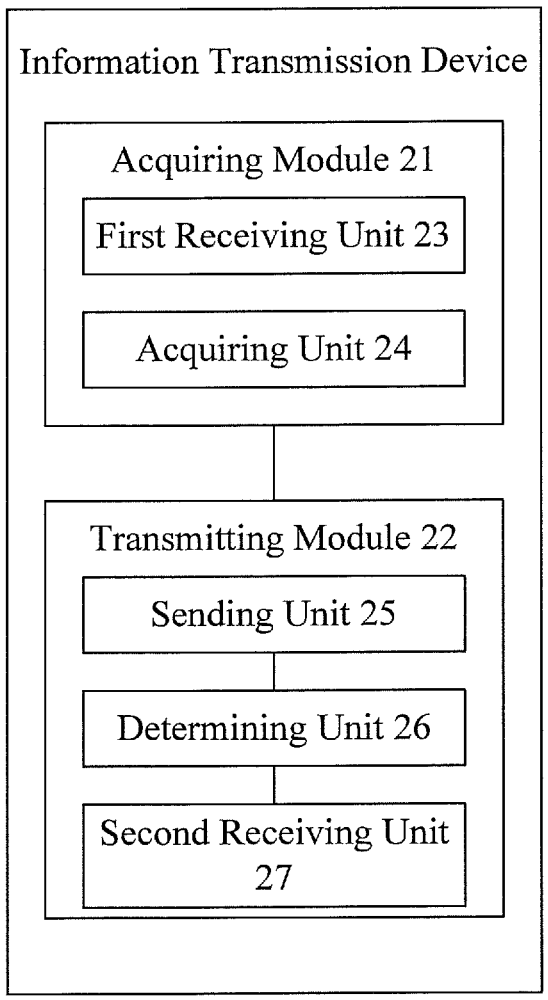
FIG. 8 is a block diagram illustrating still another information transmission device according to an embodiment of the present disclosure.

Optionally, FIG. 8 is a schematic block diagram of another information transmission device according to an embodiment of the present disclosure. The acquiring module 21 in this embodiment may include:

The first receiving unit 23 is configured to receive a notification message or control information, where the notification message or the control information includes the self-contained structure;

The acquiring unit 24 is configured to acquire the self-contained structure by blind detection.

Further, the transmitting module 22 in the embodiment of the present disclosure may include:

The sending unit 25 is configured to send data information according to a resource structure of the PRACH, where the resource structure of the PRACH is used to transmit at least one of a non-contention PRACH and a contention PRACH.

In the embodiment of the present disclosure, the transmission power of the same signal or/and the same channel remains unchanged in a self-contained structure, and the different self-contained structures are the same or different.

Further, the transmitting module 22 in the embodiment of the present disclosure may further include:

The determining unit 26 is configured to determine the information of the self-contained structure, and the determined information includes: whether the self-contained structure is configured, the starting position and the ending position of the configured self-contained structure;

The second receiving unit 27 is configured to receive the data information according to the information of the self-contained structure determined by the determining unit 26.

In a specific implementation, the first receiving unit 23 in the acquiring module 21 and the transmitting unit 25 and the second receiving unit 27 in the transmitting module 22 in the embodiments shown in FIG. 7 and FIG. 8 can transmit and receive through the UE. The implementation unit, the acquiring unit 24 in the acquiring module 21 and the determining unit 26 in the transmitting module 22 may be implemented by a processor of the UE, which may be, for example, a CPU or an ASIC, or may implement the implementation of the present disclosure. An example of one or more integrated circuits.

The information transmission device provided by the embodiment of the present disclosure is used to perform the information transmission method provided by the embodiment shown in FIG. 3 of the present disclosure, and has a corresponding function module, and the implementation principle and the technical effect are similar, and details are not described herein again.

It should be noted that, the specific process for the base station to send the data information and the manner of receiving the data information in the embodiment of the present disclosure have been described in the foregoing embodiments, and therefore are not described herein again.

Figure 9:
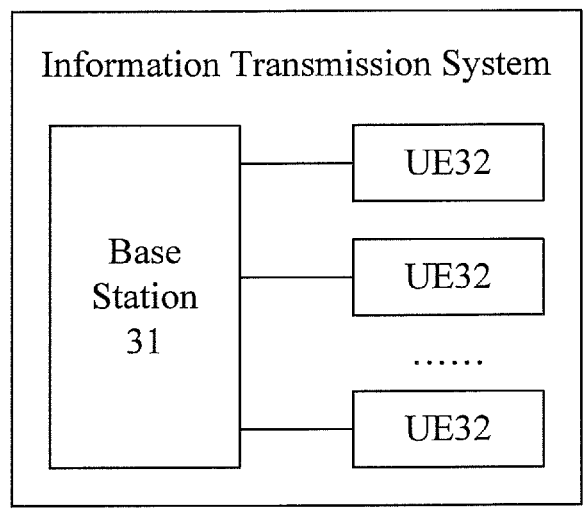
FIG. 9 is a block diagram illustrating an information transmission system according to an embodiment of the present disclosure.

FIG. 9 is a schematic block diagram of an information transmission system according to an embodiment of the present disclosure. The information transmission system provided by this embodiment may include: a base station 31 and one or more UEs 32 in the coverage of the base station 31; wherein the base station 31 is provided with the information transmission device in each embodiment shown in FIG. 5 and FIG. The UE 32 is provided with the information transmission device in each of the embodiments shown in FIGS. 7 and 8 described above. The manner in which each network element in the information transmission system of the present embodiment performs information transmission is the same as the manner in which the corresponding network element performs information transmission in the embodiment shown in FIG. 5 to FIG. 8, and is also used to perform the present disclosure FIG. 1 to FIG. The information transmission method provided by any of the embodiments shown in FIG. 4 is provided with a corresponding physical device, and the implementation principle and technical effects thereof are similar, and details are not described herein again.

Embodiments of the present disclosure may also be stored in a computer readable storage medium if implemented in the form of a software functional module and sold or used as a standalone product. Based on such understanding, the technical solution of the embodiments of the present disclosure may be embodied in the form of a software product in essence or in the form of a software product stored in a storage medium, including a plurality of instructions. A computer device (which may be a personal computer, server, or network device, etc.) is caused to perform all or part of the methods described in various embodiments of the present disclosure. The foregoing storage medium includes various media that can store program codes, such as a USB flash drive, a mobile hard disk, a read only memory (ROM), a magnetic disk, or an optical disk. Thus, embodiments of the disclosure are not limited to any specific combination of hardware and software.

The embodiment of the disclosure further provides a computer storage medium, wherein a computer program is stored, which is used to execute the information transmission method of the embodiment of the disclosure.

One of ordinary skill in the art will appreciate that all or a portion of the above steps may be performed by a program to instruct related hardware (e.g., a processor), which may be stored in a computer readable storage medium, such as a read only memory, disk or optical disk. Wait. Optionally, all or part of the steps of the above embodiments may also be implemented using one or more integrated circuits. Correspondingly, each module/unit in the above embodiment may be implemented in the form of hardware, for example, by implementing an integrated circuit to implement its corresponding function, or may be implemented in the form of a software function module, for example, executing programs/instructions stored in the memory may be executed by a processor to achieve its corresponding function. Embodiments of the disclosure are not limited to any specific form of combination of hardware and software.

While the embodiments of the present disclosure have been described above, the described embodiments are merely for the purpose of understanding the disclosure and are not intended to limit the disclosure. Any modification and variation in the form and details of the embodiments may be made by those skilled in the art without departing from the spirit and scope of the disclosure. The scope defined by the appended claims shall prevail.

What is claimed is:

1. An information transmission method, comprising:
   acquiring, by a user equipment UE, a self-contained structure, the self-contained structure comprising a time-frequency resource structure; and
   sending or receiving, by the UE, data information according to the self-contained structure;
   wherein the time-frequency resource structure comprises at least one of a reserved resource structure or a sensing resource structure, the reserved resource structure is used to indicate a basic unit of a reserved resource in the time-frequency resource structure, and the reserved resource structure comprises at least one of: a reserved subframe, a reserved orthogonal frequency division multiplexing (OFDM) symbol, a reserved element (RE), a reserved subcarrier, a reserved resource block (RB), or a reserved RB group; and
   wherein the time-frequency resource structure comprises at least one of a downlink control channel or an uplink control channel; wherein
   control information transmitted through the downlink control channel comprises scheduling information;
   control information transmitted through the uplink control channel comprises the scheduling information;
   wherein the scheduling information comprises two-stage scheduling information, and the two-stage scheduling information comprises two schedulings each comprising part of the data scheduling information in single scheduling information, wherein the single scheduling information comprises complete data scheduling information.

2. The information transmission method according to claim 1, wherein the time-frequency resource structure comprises at least one of: a time domain resource structure, a frequency domain resource structure, and a spatial resource structure.

3. The information transmission method according to claim 1, wherein the time-frequency resource structure comprises at least one of following structures:
   in a first structure, the time-frequency resource structure comprises the downlink control channel, a downlink data channel, and a downlink signal;
   in a second structure, the time-frequency resource structure comprises the uplink control channel, an uplink data channel, and an uplink signal;
   in a third structure, the time-frequency resource structure comprises the downlink control channel, a downlink data channel, a downlink signal, and the uplink control channel and an uplink signal;
   in a fourth structure, the time-frequency resource structure comprises the uplink control channel, an uplink data channel, an uplink signal, and the downlink control channel and a downlink signal;

in a fifth structure, the time-frequency resource structure comprises the downlink control channel, a downlink data channel, a downlink signal, and the uplink control channel, an uplink data channel, and an uplink signal;
a resource structure specific to a channel sounding reference signal SRS;
a resource structure specific to an uplink discovery signal UL DRS;
a resource structure specific to a physical random-access channel PRACH;
a resource structure specific to a channel state information reference symbol CSI-RS;
a beam resource structure;
a resource structure of an unlicensed carrier;
a code domain resource structure;
a UE-specific self-contained structure;
a cell-specific self-contained structure;
a node-specific self-contained structure;
a beam-specific self-contained structure; and
a carrier-specific self-contained structure.

4. The information transmission method according to claim 3, wherein any one of the downlink control channel, the uplink control channel, the downlink data channel, the downlink signal, the uplink signal and the uplink data channel meets corresponding requirements as following:
control information transmitted through the downlink control channel further comprises at least one of: control channel resource information, data channel resource information, signal resource information, resource signal, indication information of the time-frequency resource structure, sending timing of the indication information, and reserved resource information; wherein the reserved resource information is indicative of a reserve resource structure in the time-frequency resource structure;
control information transmitted through the uplink control channel further comprises at least one of: control channel resource information, data channel resource information, signal resource information, resource signal, indication information of the time-frequency resource structure, sending timing of the indication information, and reserved resource information; wherein the reserved resource information is indicative of a reserve resource structure in the time-frequency resource structure;
the downlink data channel comprises at least one of: a downlink data channel of a single data service, and a downlink data channel of two or more different types of data services; wherein a resource structure in the time-frequency resource structure corresponding to the downlink data channel of the single data service comprises at least one of: a time domain resource structure, a frequency domain resource structure, a spatial vector/matrix, and a relationship with the downlink control channel; a resource structure in the time-frequency resource structure corresponding to the downlink data channel of the two or more different types of data services comprises: part or all of the resource structure in the time-frequency resource structure corresponding to the downlink data channel of the single data service;
the downlink signal comprises at least one of: a demodulation reference signal specific to a user equipment UE, a reference signal specific to the time-frequency resource structure, a channel information reference signal specific to the time-frequency resource structure, a preamble signal specific to the time-frequency resource structure, an identifier signal specific to the time-frequency resource structure, and a cell-specific reference signal, a beam-specific reference signal, and a node-specific reference signal;
the uplink signal comprises at least one of: an uplink preamble signal, an uplink demodulation reference signal, and an uplink SRS signal; and
the uplink data channel comprises at least one of: an uplink data channel of a single data service, and an uplink data channel of two or more different types of data services; wherein a resource structure in the time-frequency resource structure corresponding to the uplink data channel of the single data service comprises at least one of: a time domain resource structure, a frequency domain resource structure, a spatial vector/matrix, and a relationship with the uplink control channel; a resource structure in the time-frequency resource structure corresponding to the uplink data channel of the two or more different types of data services comprises: part or all of the resource structure in the time-frequency resource structure corresponding to the uplink data channel of the single data service.

5. The information transmission method according to claim 4, wherein the control information transmitted through the uplink control channel comprises at least one of: scheduling information of the uplink data channel, an index relationship corresponding to a pre-scheduling, and an index relationship corresponding to a semi-persistent scheduling.

6. The information transmission method according to claim 5, wherein
an inter-cell interference is processed by an operation comprising: determining whether to perform time slot switching of a current cell after sensing a time slot occupancy of a neighboring cell; and
an uplink and downlink interference between different UEs in a cell is processed by an operation comprising: performing alignment of uplink and downlink time slot relationship between the different UEs.

7. The information transmission method according to claim 6, wherein a sub-frame type selection operation after the sensing operation comprises: dynamically selecting a sub-frame type or selecting the sub-frame type based on an alignment criterion of uplink and downlink time slot relationship between different UEs.

8. The information transmission method according to claim 1, wherein the time-frequency resource of the self-contained structure comprises at least one of:
the self-contained structure comprises continuous time-frequency resources;
the self-contained structure comprises resources being continuous in frequency domain but discontinuous in time domain;
the self-contained structure comprises resources being discontinuous in frequency domain but continuous in time domain;
the self-contained structure comprises resources being discontinuous in frequency domain and discontinuous in time domain.

9. The information transmission method according to claim 1, wherein the sending data information according to the self-contained structure comprises:
sending, by a user equipment UE, the data information according to a resource structure of a physical random-access channel PRACH, the resource structure of the PRACH being used to transmit at least one of a non-contention PRACH and a contention PRACH; or
determining, by a base station, a hybrid automatic repeat request HARQ manner according to the self-contained structure, and repeatedly sending, by the base station, the data information according to the determined HARQ manner.

10. The information transmission method according to claim 1, wherein a transmission power of a same signal remains unchanged in the self-contained structure, and is same as or different from each other among different self-contained structures; or,
a transmission power of a same channel remains unchanged in the self-contained structure, and is same as or different from each other among different self-contained structures; or,
a transmission power of the same signal and of the same channel remains unchanged in the self-contained structure and is same as or different from each other among different self-contained structures.

11. The information transmission method according to claim 1, wherein the receiving, by the UE, data information according to the self-contained structure comprises:
determining, by the UE, information about the self-contained structure, the determined information comprising at least one of: whether the self-contained structure is configured, a starting position and an ending position of the self-contained structure as configured; and
receiving, by the UE, the data information according to the determined information of the self-contained structure.

12. A non-transitory computer storage medium, storing computer-executable instructions, wherein the computer-executable instructions are configured to implement the information transmission method according to claim 1.

13. A user equipment, comprising:
a memory, configured to store instructions; and
a processor, configured to execute the instructions to perform:
acquiring a self-contained structure, the self-contained structure comprising a time-frequency resource structure; and
sending or receiving data information according to the self-contained structure;
wherein the time-frequency resource structure comprises at least one of a reserved resource structure or a sensing resource structure, the reserved resource structure is used to indicate a basic unit of a reserved resource in the time-frequency resource structure, and the reserved resource structure comprises at least one of: a reserved subframe, a reserved orthogonal frequency division multiplexing (OFDM) symbol, a reserved element (RE), a reserved subcarrier, a reserved resource block (RB), or a reserved RB group; and
wherein the time-frequency resource structure comprises at least one of a downlink control channel or an uplink control channel; wherein
control information transmitted through the downlink control channel comprises scheduling information;
control information transmitted through the uplink control channel comprises the scheduling information;
wherein the scheduling information comprises two-stage scheduling information, and the two-stage scheduling information comprises two schedulings each comprising part of the data scheduling information in single scheduling information, wherein the single scheduling information comprises complete data scheduling information.

14. The user equipment according to claim 13, wherein the time-frequency resource structure comprises at least one of: a time domain resource structure, a frequency domain resource structure, and a spatial resource structure.

15. The user equipment according to claim 13, wherein the time-frequency resource structure comprises at least one of following structures:
in a first structure, the time-frequency resource structure comprises the downlink control channel, a downlink data channel, and a downlink signal;
in a second structure, the time-frequency resource structure comprises the uplink control channel, an uplink data channel, and an uplink signal;
in a third structure, the time-frequency resource structure comprises the downlink control channel, a downlink data channel, a downlink signal, and the uplink control channel and an uplink signal;
in a fourth structure, the time-frequency resource structure comprises the uplink control channel, an uplink data channel, an uplink signal, and the downlink control channel and a downlink signal;
in a fifth structure, the time-frequency resource structure comprises the downlink control channel, a downlink data channel, a downlink signal, and the uplink control channel, an uplink data channel, and an uplink signal;
a resource structure specific to a channel sounding reference signal SRS;
a resource structure specific to an uplink discovery signal UL DRS;
a resource structure specific to a physical random-access channel PRACH;
a resource structure specific to a channel state information reference symbol CSI-RS;
a beam resource structure;
a resource structure of an unlicensed carrier;
a code domain resource structure;
a UE-specific self-contained structure;
a cell-specific self-contained structure;
a node-specific self-contained structure;
a beam-specific self-contained structure; and
a carrier-specific self-contained structure.

16. The user equipment according to claim 15, wherein any one of the downlink control channel, the uplink control channel, the downlink data channel, the downlink signal, the uplink signal and the uplink data channel meets corresponding requirements as following:
control information transmitted through the downlink control channel further comprises at least one of: control channel resource information, data channel resource information, signal resource information, resource signal, indication information of the time-frequency resource structure, sending timing of the indication information, and reserved resource information; wherein the reserved resource information is indicative of a reserve resource structure in the time-frequency resource structure;
control information transmitted through the uplink control channel further comprises at least one of: control channel resource information, data channel resource information, signal resource information, resource signal, indication information of the time-frequency resource structure, sending timing of the indication information, and reserved resource information; wherein the reserved resource information is indicative of a reserve resource structure in the time-frequency resource structure;
the downlink data channel comprises at least one of: a downlink data channel of a single data service, and a downlink data channel of two or more different types of data services; wherein a resource structure in the time-frequency resource structure corresponding to the downlink data channel of the single data service comprises at least one of: a time domain resource structure, a frequency domain resource structure, a spatial vector/matrix, and a relationship with the downlink control channel; a resource structure in the time-frequency resource structure corresponding to the downlink data channel of the two or more different types of data services comprises: part or all of the resource structure in the time-frequency resource structure corresponding to the downlink data channel of the single data service;

the downlink signal comprises at least one of: a demodulation reference signal specific to a user equipment UE, a reference signal specific to the time-frequency resource structure, a channel information reference signal specific to the time-frequency resource structure, a preamble signal specific to the time-frequency resource structure, an identifier signal specific to the time-frequency resource structure, and a cell-specific reference signal, a beam-specific reference signal, and a node-specific reference signal;

the uplink signal comprises at least one of: an uplink preamble signal, an uplink demodulation reference signal, and an uplink SRS signal; and the uplink data channel comprises at least one of: an uplink data channel of a single data service, and an uplink data channel of two or more different types of data services; wherein a resource structure in the time-frequency resource structure corresponding to the uplink data channel of the single data service comprises at least one of: a time domain resource structure, a frequency domain resource structure, a spatial vector/matrix, and a relationship with the uplink control channel; a resource structure in the time-frequency resource structure corresponding to the uplink data channel of the two or more different types of data services comprises: part or all of the resource structure in the time-frequency resource structure corresponding to the uplink data channel of the single data service.

17. The user equipment according to claim 16, wherein the control information transmitted through the uplink control channel comprises at least one of: scheduling information of the uplink data channel, an index relationship corresponding to a pre-scheduling, and an index relationship corresponding to a semi-persistent scheduling.

18. The information transmission method according to claim 1, wherein the self-contained structure comprises one or more basic units, and a configuration manner of the self-contained structure comprises at least one of:
  indicating, through a dynamic indication message or a semi-static indication message, resource content of a subframe in the self-contained structure;
  wherein a time slot of the self-contained structure is used to transmit the dynamic indication message, the time slot comprising at least one of an uplink time slot and a downlink time slot, the dynamic indication message comprising at least one of a channel dynamic indication message and a signal dynamic indication message;
  part of subframes or part of basic units among all the basic units of the self-contained structure is used for a dedicated resource set, the dedicated resource set comprising at least one of an uplink dedicated resource set and a downlink dedicated resource set;
  the self-contained structure is also provided with a self-contained subframe structure for uplink control information UCI coverage.

19. The information transmission method according to claim 1, further comprising at least one of the following:
  for an uplink, detecting, by the UE and on segmented sensing resources configured, whether the base station performs a downlink (DL)/uplink (UL) switch; or
  for a side link, detecting, by the UE and on segmented sensing resources configured, whether a DL/UL switch is performed on the side link.

* * * * *